US011231805B2

(12) United States Patent
Guo et al.

(10) Patent No.: US 11,231,805 B2
(45) Date of Patent: Jan. 25, 2022

(54) DATA TRANSMISSION METHOD, CHIP, CONTROLLER AND DISPLAY DEVICE

(71) Applicants: Beijing BOE Display Technology Co., Ltd., Beijing (CN); BOE Technology Group Co., Ltd., Beijing (CN)

(72) Inventors: Zhijie Guo, Beijing (CN); Ming Chen, Beijing (CN); Jieqiong Wang, Beijing (CN); Xin Duan, Beijing (CN); Hsin-Chung Lo, Beijing (CN); Hao Zhu, Beijing (CN)

(73) Assignees: Beijing BOE Display Technology Co., LTD., Beijing (CN); BOE Technology Group Co., LTD., Beijing (CN)

( * ) Notice: Subject to any disclaimer, the term of this patent is extended or adjusted under 35 U.S.C. 154(b) by 9 days.

(21) Appl. No.: 16/643,261

(22) PCT Filed: Aug. 6, 2019

(86) PCT No.: PCT/CN2019/099510
§ 371 (c)(1),
(2) Date: Feb. 28, 2020

(87) PCT Pub. No.: WO2020/029974
PCT Pub. Date: Feb. 13, 2020

(65) Prior Publication Data
US 2020/0257399 A1    Aug. 13, 2020

(30) Foreign Application Priority Data

Aug. 6, 2018 (CN) .................. 201810886391.X

(51) Int. Cl.
*G06F 3/041* (2006.01)
*G06F 3/14* (2006.01)
*G09G 3/20* (2006.01)

(52) U.S. Cl.
CPC .......... *G06F 3/0416* (2013.01); *G06F 3/1407* (2013.01); *G09G 3/20* (2013.01); *G09G 2310/08* (2013.01)

(58) Field of Classification Search
CPC .. G06F 3/1407; G06F 3/0416; G06F 3/04164; G06F 3/0412; G06F 3/04184;
(Continued)

(56) References Cited

U.S. PATENT DOCUMENTS 5,895,140 A * 4/1999 Koh .................. H04N 1/32561
399/77
2014/0204049 A1 7/2014 Tsai et al.
(Continued)

FOREIGN PATENT DOCUMENTS

| CN | 103941926 A | 7/2014 |
| CN | 105976779 A | 9/2016 |
| CN | 109976570 A | 7/2019 |

OTHER PUBLICATIONS

International search report of PCT application No. PCT/CN2019/099510 dated Nov. 4, 2019.

*Primary Examiner* — Christopher E Leiby

(57) ABSTRACT

A data transmission method, a chip, a controller, and a display device. The method is applied to a target driving chip in the display device. The display device includes a controller (01), a plurality of driving chips (02), and an in-cell touch display panel (03). The target driving chip is one of the plurality of driving chips (02). The target driving chip is respectively connected to the controller (01) and the in-cell touch display panel (03). The method includes: receiving state data acquired by the in-cell touch display panel, the state data being configured to reflect a working state of the in-cell touch display panel; and sending return data to the controller, the return data including the state data which includes control data.

20 Claims, 16 Drawing Sheets

(58) Field of Classification Search
CPC ...... G09G 3/20; G09G 3/3406; G09G 3/2096;
G09G 3/3696; G09G 5/00; G09G
2370/00; G09G 2370/14; G09G 2310/08;
G09G 2354/00; G09G 2330/022; G09G
2300/0426
See application file for complete search history.

(56) References Cited

U.S. PATENT DOCUMENTS

2019/0179484 A1\* 6/2019 Jang ..................... G06F 3/044
2020/0027416 A1\* 1/2020 Kim ..................... G02F 1/1345

\* cited by examiner

DATA TRANSMISSION METHOD, CHIP, CONTROLLER AND DISPLAY DEVICE

This application is a 371 of PCT Application No. PCT/CN2019/099510 filed Aug. 6, 2019, which claims priority to Chinese patent disclosure No. 201810886391.X, filed on Aug. 6, 2018 and titled "Data Transmission Method and Device, and Display Device", which is incorporated herein by reference in its entirety.

TECHNICAL FIELD

The present disclosure relates to a data transmission method, a chip, a controller and a display device.

BACKGROUND

A driving part of a display panel generally includes a timing controller, a source driver, and a gate driver, wherein the source driver includes a plurality of source driving chips, and the gate driver includes a plurality of gate driving chips.

SUMMARY

Embodiments of the present disclosure provide a data transmission method, a chip, a controller and a display device. The technical solutions are as follows:

In a first aspect of the embodiments of the present disclosure, a data transmission method is provided. The method is applied to a target driving chip in a display device, wherein the display device comprises a controller, a plurality of driving chips, and an in-cell touch display panel; the target driving chip is one of the plurality of driving chips, and is respectively connected to the controller and the in-cell touch display panel; the method comprises:

receiving state data acquired by the in-cell touch display panel, the state data being configured to reflect a working state of the in-cell touch display panel and including touch data; and sending return data to the controller, the return data including the state data.

Optionally, the controller is connected to the target driving chip through a first differential signal line;

sending the return data to the controller comprises:

sending the return data to the controller through the first differential signal line.

Optionally, the method, sending the return data to the controller through the first differential signal line comprises:

sending the return data to the controller through the first differential signal line in a form of a data packet, wherein each data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, each data packet further comprises: a setup mode bit and a mode setting bit which are arranged between the start bit and the data bit in sequence, and a check bit between the data bit and the stop bit, wherein the setup mode bit is configured to indicate a mode of the mode setting of the data packet, the mode setting bit is configured to indicate a mode of the data packet, the check bit is configured to perform data check, and the mode of the data packet includes a request mode or a response mode.

Optionally, the touch data comprises at least one of touch position data and touch pressure data.

Optionally, the return data further comprises at least one of first indication information, working mode data of the driving chips, and second indication information, wherein the first indication information is configured to indicate whether a working state of the in-cell touch display panel is abnormal, and the second indication information is configured to indicate whether a working state of the target driving chip is abnormal.

Optionally, the in-cell touch display panel comprises a sensor; and receiving the state data acquired by the in-cell touch display panel comprises:

receiving the touch data and data collected by the sensor.

Optionally, prior to sending the return data to the controller, the method further comprising:

performing analog-to-digital conversion of the state data in a form of an analog signal to obtain the state data in a form of a digital signal; and generating the return data, the return data comprising the state data in the form of a digital signal.

Optionally, the controller is connected to the target driving chip through a first differential signal line, and the controller is also connected to the target driving chip through a second differential signal line; and the method further comprises:

receiving a control signal sent by the controller through the second differential signal line; and sending the return data to the controller comprises:

sending the return data to the controller in real time through the first differential signal line.

Optionally, the in-cell touch display panel is an organic light-emitting diode (OLED) display panel, a quantum dot display panel, a micro light-emitting diode display panel, or a liquid crystal display panel integrated with a touch function layer;

the driving chip is a source driving chip or a gate driving chip; and the controller is any one of a timing controller, a system chip SOC, and a micro control unit MCU integrated in the timing controller.

Optionally, the controller is connected to the target driving chip through a first differential signal line; and sending the return data to the controller comprises: sending the return data to the controller through the first differential signal line in a form of a data packet;

wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission; the data packet further comprises: a setup mode bit and a mode setting bit which are arranged in sequence between the start bit and the data bit, and a check bit between the data bit and the stop bit; wherein the setup mode bit is configured to indicate a mode of a mode setting of the data packet, the mode setting bit is configured to indicate a mode of the data packet, the check bit is configured to perform data check, and the mode of the data packet includes any one of a request mode and a response mode;

the touch data comprises at least one of touch position data and touch pressure data;

the return data further comprises at least one of first indication information, working mode data of the driving chips, and second indication information, wherein the first indication information is configured to indicate whether the working state of the in-cell touch display panel is abnormal, and the second indication information is configured to indicate whether a working state of the target driving chip is abnormal;

the in-cell touch display panel comprises a sensor; and receiving the state data acquired by the in-cell touch display panel comprises: receiving the touch data and data collected by the sensor;

prior to sending the return data to the controller, the method further comprises: performing analog-to-digital conversion of the state data in a form of an analog signal to obtain the state data in a form of a digital signal; and generating the return data, the return data comprising the state data in the form of a digital signal;

the controller is connected to the target driving chip through a first differential signal line, and the controller is further connected to the target driving chip through a second differential signal line; and the method further comprises: receiving a control signal sent by the controller through the second differential signal line; and sending the return data to the controller comprises: sending the return data to the controller in real time through the first differential signal line;

the in-cell touch display panel is any one of an organic light-emitting diode (OLED) display panel, a quantum dot display panel, a micro light-emitting diode display panel, and a liquid crystal display panel which are integrated with a touch function layer; the target driving chip is any one of a source driving chip and a gate driving chip; and the controller is any one of a timing controller, a system chip SOC, and a micro control unit MCU integrated in the timing controller.

In a second aspect of the embodiments of the present disclosure, a data transmission method is provided. The method is applied to a controller in a display device, wherein the display device comprises the controller, a plurality of driving chips, and an in-cell touch display panel; and the method comprises:

receiving return data sent by the target driving chip, the return data comprising state data;

the target driving chip is one of the plurality of driving chips, and the target driving chip is respectively connected to the controller and the in-cell touch display panel; and the return data is sent by the target driving chip to the controller after the target driving chip receives the state data acquired by the in-cell touch display panel, the state data being configured to reflect a working state of the in-cell touch display panel and including touch data.

Optionally, the controller is connected to the target driving chip through a first differential signal line;

receiving the return data sent by the target driving chip comprises:

receiving the return data sent by the target driving chip through the first differential signal line.

Optionally receiving the return data sent by the target driving chip through the first differential signal line comprises:

receiving the return data sent by the target driving chip and transmitted in a form of a data packet through the first differential signal line, wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, the data packet further comprises: a setup mode bit and a mode setting bit which are arranged between the start bit and the data bit in sequence, and a check bit between the data bit and the stop bit, wherein the setup mode bit is configured to indicate a mode of the mode setting of the data packet, the mode setting bit is configured to indicate a mode of the data packet, the check bit is configured to perform data check, and the mode of the data packet includes a request mode or a response mode.

Optionally, the controller is also connected to the target driving chip through a second differential signal line; and the method further comprises:

sending a control signal to the target driving chip through the second differential signal line; and receiving the return data sent by the target driving chip through the first differential signal line comprises:

receiving the return data sent by the target driving chip in real time through the first differential signal line.

Optionally, the controller is connected to the target driving chip through a first differential signal line; and receiving the return data sent by the target driving chip comprises: receiving the return data sent by the target driving chip in real time through the first differential signal line;

receiving the return data sent by the target driving chip through the first differential signal line comprises: receiving the return data sent by the target driving chip and transmitted in a form of a data packet through the first differential signal line; wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission; the data packet further comprises: a setup mode bit and a mode setting bit which are arranged in sequence between the start bit and the data bit, and a check bit between the data bit and the stop bit, wherein the setup mode bit is configured to indicate a mode of a mode setting of the data packet, the mode setting bit is configured to indicate a mode of the data packet, the check bit is configured to perform data check, and the mode of the data packet includes any one of a request mode and a response mode;

the controller is further connected to the target driving chip through a second differential signal line; and the method further comprises: sending a control signal to the target driving chip through the second differential signal line.

In a third aspect of the embodiments of the present disclosure, a target driving chip is provided. A display device where the target driving chip is located comprises a controller, a plurality of driving chips, and an in-cell touch display panel; the target driving chip is one of the plurality of driving chips, and is respectively connected to the controller and the in-cell touch display panel; and the target driving chip comprises:

a first receiving module configured to receive state data acquired by the in-cell touch display panel, the state data being configured to reflect a working state of the in-cell touch display panel and including touch data; and a sending module configured to send return data to the controller, the return data including the state data.

Optionally, the controller is connected to the target driving chip through a first differential signal line; and the sending module comprises:

a sending submodule configured to send the return data to the controller through the first differential signal line.

Optionally, the controller is also connected to the target driving chip through a second differential signal line; and the device further includes:

a second receiving module configured to receive a control signal sent by the controller through the second differential signal line; and the sending submodule is configured to:

send the return data to the controller in real time through the first differential signal line.

Optionally, the sending submodule is configured to:

send the return data to the controller through the first differential signal line in a form of a data packet, wherein the data packet comprises a start bit, a data bit, and a stop bit which are arranged in sequence, wherein the start bit is configured to indicate the start of data transmission, the data bit is configured to carry the data to be transmitted, and the stop bit is configured to indicate the end of data transmission.

Optionally, the data packet further comprises: a setup mode bit and a mode setting bit which are arranged between the start bit and the data bit in sequence, and a check bit between the data bit and the stop bit, wherein the setup mode bit is configured to indicate a mode of the mode setting of the data packet, the mode setting bit is configured to indicate a mode of the data packet, the check bit is configured to perform data check, and the pattern of the data packet includes a request mode or a response mode.

Optionally, the touch data comprises at least one of touch position data and touch pressure data.

Optionally, the return data further comprises at least one of first indication information, the working state data of the driving chips, and second indication information, wherein the first indication information is configured to indicate whether a working state of the in-cell touch display panel is abnormal, and the second indication information is configured to indicate whether a working state of the target driving chip is abnormal.

Optionally, the in-cell touch display panel comprises a sensor; and the first receiving module is configured to receive the touch data and data collected by the sensor.

Optionally, the target driving chip further comprises:

a conversion module configured to perform analog-to-digital conversion of the state data in a form of an analog signal prior to sending the return data to the controller, to obtain the state data in a form of a digital signal; and a generation module configured to generate the return data, the return data comprising the state data in the form of a digital signal.

Optionally, the controller is connected to the target driving chip through a first differential signal line, and is also connected to the target driving chip through a second differential signal line; and the target driving chip further comprises:

a second receiving module configured to receive a control signal sent by the controller through the second differential signal line; and the sending module configured to send the return data to the controller in real time through the first differential signal line.

Optionally, the target driving chip is a source driving chip or a gate driving chip; the in-cell touch display panel is an OLED display panel, a quantum dot display panel, a micro light-emitting diode display panel, or a liquid crystal display panel integrated with a touch function layer;

the controller is any one of a timing controller, a system chip SOC, and a micro control unit MCU integrated in the timing controller.

In a fourth aspect of the embodiments of the present disclosure, a controller is provided. A display device where the controller is located further comprises a plurality of driving chips and an in-cell touch display panel; and the controller comprises:

a receiving module configured to receive return data sent by the target driving chip, the return data comprising state data;

the target driving chip is one of the plurality of driving chips, and is respectively connected to the controller and the in-cell touch display panel; and the return data is sent by the target driving chip to the controller after the target driving chip receives the state data acquired by the in-cell touch display panel, the state data being configured to reflect a working state of the in-cell touch display panel and including touch data.

Optionally, the controller is connected to the target driving chip through a first differential signal line; and the receiving module comprises:

a receiving submodule configured to receive the return data sent by the target driving chip through the first differential signal line.

Optionally, the receiving submodule is configured to:

receive the return data sent by the target driving chip and transmitted in a form of a data packet through the first differential signal line, wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, the data packet further comprises: a setup mode bit and a mode setting bit which are arranged between the start bit and the data bit in sequence, and a check bit between the data bit and the stop bit, wherein the setup mode bit is configured to indicate a mode of the mode setting of the data packet, the mode setting bit is configured to indicate a mode of the data packet, the check bit is configured to perform data check, and the mode of the data packet includes a request mode or a response mode.

Optionally, the controller is also connected to the target driving chip through a second differential signal line; and the controller further comprises:

a sending module configured to send a control signal to the target driving chip through a second differential signal line; and the receiving submodule is configured to:

receive the return data sent by the target driving chip in real time through the first differential signal line.

In a fifth aspect of the embodiments of the present disclosure, a target driving chip is provided. A display device comprises a controller, a plurality of driving chips, and an in-cell touch display panel; the target driving chip is one of the plurality of driving chips, and is respectively connected to the controller and the in-cell touch display panel; and the target driving chip comprises:

a processor; and a memory configured to store an executable instruction of the processor therein, wherein when operating the executable instruction, the processor can execute any one of the data transmission methods in the first aspect.

In a sixth aspect of the embodiments of the present disclosure, a controller is provided. A display device where the controller is located further comprises a plurality of driving chips and an in-cell touch display panel; and the target driving chip comprises:

a processor; and a memory configured to store an executable instruction of the processor, wherein when operating the executable instruction, the processor can execute any one of the data transmission methods in the second aspect.

In a seventh aspect of the embodiments of the present disclosure, a target driving chip is provided. The display device where the target driving chip is located comprises a controller, a plurality of driving chips, and an in-cell touch display panel; the target driving chip is one of the plurality of driving chips, and is respectively connected to the controller and the in-cell touch display panel; and the target driving chip is configured to:

receive state data acquired by the in-cell touch display panel, the state data being configured to reflect a working state of the in-cell touch display panel and including touch data; and send return data to the controller, the return data including the state data.

Optionally, the controller is connected to the target driving chip through a first differential signal line, and the target driving chip is configured to:

send the return data transmitted to the controller through the first differential signal line.

Optionally, the target driving chip is configured to:

send the return data in a form of a data packet to the controller through the first differential signal line;

wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, the data packet further comprises: a setup mode bit and a mode setting bit which are arranged in sequence between the start bit and the data bit, and a check bit between the data bit and the stop bit, wherein the setup mode bit is configured to indicate a mode of a mode setting of the data packet, the mode setting bit is configured to indicate a mode of the data packet, the check bit is configured to perform data check, and the mode of the data packet includes any one of a request mode and a response mode.

Optionally, the touch data comprises at least one of touch position data and touch pressure data.

Optionally, the return data further comprises at least one of first indication information, working mode data of the driving chips, and second indication information, wherein the first indication information is configured to indicate whether the working state of the in-cell touch display panel is abnormal, and the second indication information is configured to indicate whether a working state of the target driving chip is abnormal.

Optionally, the in-cell touch display panel comprises a sensor; and the target driving chip is configured to: receive the touch data and data collected by the sensor.

Optionally, the target driving chip is further configured to:

prior to sending the return data to the controller, perform analog-to-digital conversion of the state data in a form of an analog signal to obtain the state data in a form of a digital signal;

and generate the return data, the return data comprising the state data in the form of a digital signal.

Optionally, the controller is connected to the target driving chip through a first differential signal line, and is further connected to the target driving chip through a second differential signal line, and the target driving chip is further configured to:

receive a control signal sent by the controller through the second differential signal line; and send the return data in a form of a data packet to the controller in real time through the first differential signal line.

Optionally, the target driving chip is any one of a source driving chip and a gate driving chip;

the in-cell touch display panel is any one of an organic light-emitting diode (OLED) display panel, a quantum dot display panel, a micro light-emitting diode display panel, and a liquid crystal display panel which are integrated with a touch function layer; and the controller is any one of a timing controller, a system chip SOC, and a micro control unit MCU integrated in the timing controller Optionally, the touch data comprises at least one of touch position data and touch pressure data;

the return data further comprises at least one of first indication information, working mode data of the driving chips, and second indication information, wherein the first indication information is configured to indicate whether the working state of the in-cell touch display panel is abnormal, and the second indication information is configured to indicate whether a working state of the target driving chip is abnormal;

the in-cell touch display panel comprises a sensor; and the target driving chip is configured to: receive the touch data and data collected by the sensor;

the target driving chip is further configured to: prior to sending the return data to the controller, perform analog-to-digital conversion of the state data in a form of an analog signal to obtain the state data in a form of a digital signal; and generate the return data, the return data comprising the state data in the form of a digital signal;

the controller is connected to the target driving chip through a first differential signal line, and the controller is further connected to the target driving chip through a second differential signal line; and the target driving chip is further configured to: receive a control signal sent by the controller through the second differential signal line; and send the return data to the controller in real time through the first differential signal line;

the target driving chip is any one of a source driving chip and a gate driving chip; the in-cell touch display panel is any one of an organic light-emitting diode (OLED) display panel, a quantum dot display panel, a micro light-emitting diode display panel, and a liquid crystal display panel which are integrated with a touch function layer; and the controller is any one of a timing controller, a system chip SOC, and a micro control unit MCU integrated in the timing controller.

In an eighth aspect of the embodiments of the present disclosure, a controller is provided. The display device where the controller is located further comprises a plurality of driving chips and an in-cell touch display panel; and the controller is configured to:

receive return data sent by a target driving chip, the return data comprising state data;

wherein, the target driving chip is one of the plurality of driving chips, and is respectively connected to the controller and the in-cell touch display panel; and the return data is sent by the target driving chip to the controller after the target driving chip receives the state data acquired by the in-cell touch display panel, the state data being configured to reflect a working state of the in-cell touch display panel and including touch data.

Optionally, the controller is connected to the target driving chip through a first differential signal line, and the controller is configured to:

receive the return data sent by the target driving chip through the first differential signal line.

Optionally, the controller is configured to:

receive the return data sent by the target driving chip and transmitted in a form of a data packet through the first differential signal line;

wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, the data packet further comprises: a setup mode bit and a mode setting bit which are arranged in sequence between the start bit and the data bit, and a check bit between the data bit and the stop bit, wherein the setup mode bit is configured to indicate a mode of a mode setting of the data packet, the mode setting bit is configured to indicate a mode of the data packet, the check bit is configured to perform data check, and the mode of the data packet includes any one of a request mode and a response mode.

Optionally, the controller is further connected to the target driving chip through a second differential signal line, and the controller is configured to:

send a control signal to the target driving chip through the second differential signal line;

receive the return data sent by the target driving chip in real time through the first differential signal line.

In a ninth aspect of the embodiments of the present disclosure, a display device is provided. The display device comprises a controller, a plurality of driving chips, and an in-cell touch display panel;

the controller is any one of the controllers in the fourth aspect, and the plurality of driving chips include any one of the target driving chips in the third aspect; or the controller is the controller in the sixth aspect, and the plurality of driving chips include the target driving chip in the fifth aspect; or the controller is the controller in the eighth aspect, and the plurality of driving chips include the target driving chip in the seventh aspect.

Optionally, the controller is connected to the target driving chip through a first differential signal line, and the target driving chip is configured to send return data to the controller through the first differential signal line.

Optionally, the controller is also connected to the target driving chip through a first and a second differential signal line;

the controller is configured to send a control signal to the target driving chip through the second differential signal line; and the target driving chip is configured to send the return data to the controller in real time through the first different signal line.

In a tenth aspect of the embodiments of the present disclosure, a computer-readable storage medium is provided. The computer-readable storage medium is configured to store instructions therein, wherein when the instruction operates on a processing component of a computer, the processing component executes any one of the data transmission methods in the first aspect, or when the instruction operates on a processing component of a computer, the processing component executes any one of the data transmission methods in the second aspect.

It is to be understood that both the foregoing general description and the following detailed description are exemplary and explanatory only and are not intended to limit the present disclosure.

DETAILED DESCRIPTION

The present disclosure will be described in detail below with reference to the accompanying drawings, to present the principles, technical solutions, and advantages of the present disclosure more clearly. It is apparent that the described embodiments are only a part of embodiments of the present disclosure, rather than all of the embodiments. Based on the embodiments of the present disclosure, all of the other embodiments obtained by a person ordinary skill in the art without consuming any creative work fall within the protection scope of the present disclosure.

Figure 1:
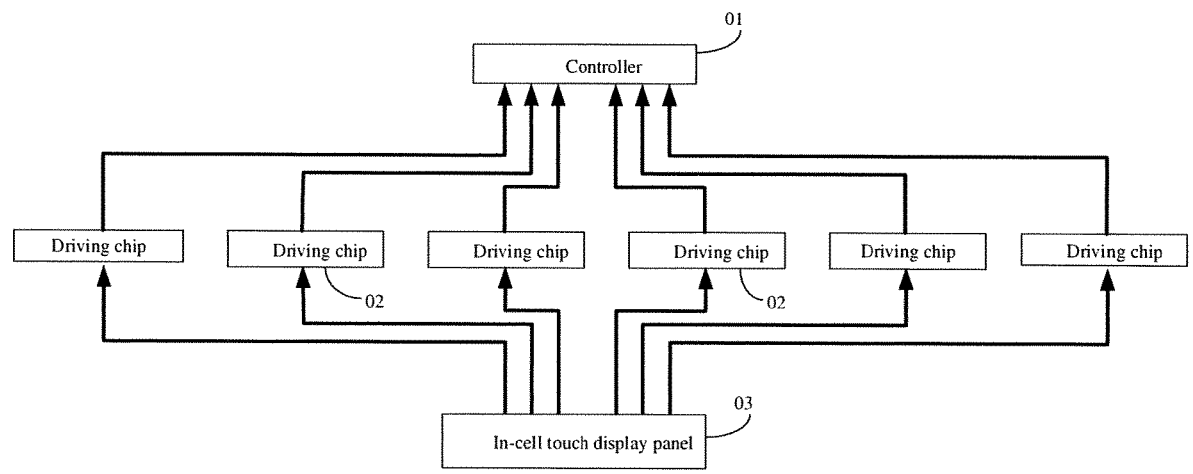
FIG. 1 is a schematic diagram of an application environment of a data transmission method according to an exemplary embodiment of the present disclosure.

FIG. 1 is a schematic diagram of an application environment of a data transmission method according to an embodiment of the present disclosure. As shown in FIG. 1, the data transmission method is applied to a display device. The display device includes a controller 01, a plurality of driving chips 02, and an in-cell touch display panel 03. The in-cell touch display panel is a display panel integrated with a touch function layer (referred to as "a touch layer"), that is, a display panel embedded with a touch function layer (for example, the touch function layer is embedded in a pixel of the display panel). The in-cell touch display panel may be an Organic Light-Emitting Diode (OLED) display panel, a quantum dot display panel, a micro light-emitting diode display panel or a Liquid Crystal Display (LCD) panel.

It should be noted that the dimension of the micro light-emitting diode is smaller than that of a light-emitting diode. Exemplarily, the minimum dimension of the micro light-emitting diode can reach a micron level. The micro light-emitting diode in the embodiment of the present disclosure may include a Micro Light Emitting Diode (Micro LED) or a mini Light Emitting Diode (Mini-LED).

The plurality of driving chips 02 is respectively connected to the controller 01. At least one of the plurality of driving chips 02 is further connected to the in-cell touch display panel 03. The at least one driving chip 02 has a return data transmission function. FIG. 1 is illustrated by taking the case that the plurality of driving chips 02 has a return data transmission function respectively and is connected to the in-cell touch display panel 03 respectively as an example, which will not be limited herein.

Figure 2:
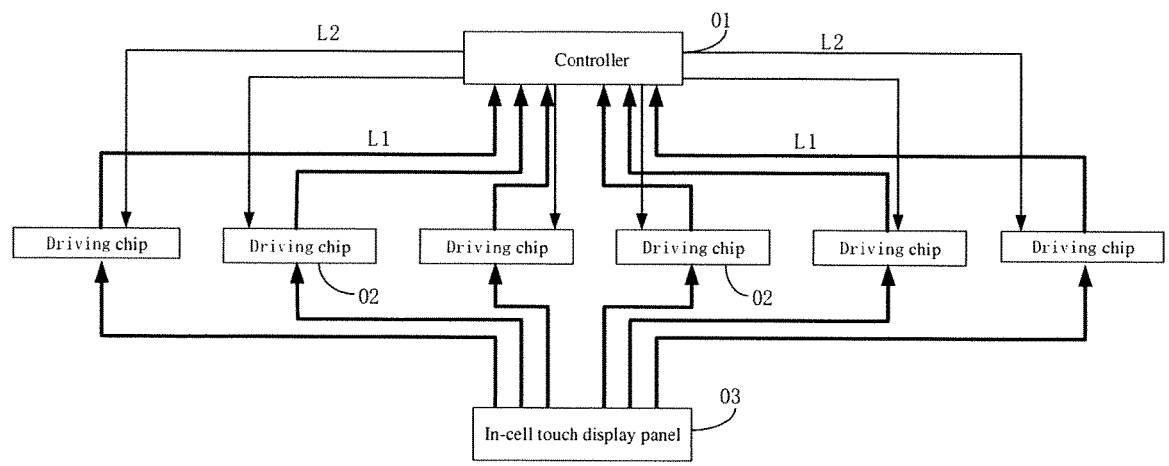
FIG. 2 is a schematic diagram of an application environment of another data transmission method according to an exemplary embodiment of the present disclosure.

Further, in the embodiment of the present disclosure, the controller 01 may be configured to control the driving chips 02. Based on this, the data transmission method provided by the embodiment of the present disclosure may be used to perform return of state data acquired by the in-cell touch display panel by returning data. In order to ensure the effective transmission of control signals and the state data, as shown in FIG. 2, the controller 01 may be connected to each of the at least one driving chip 02 through a first signal line L1 and a second signal line L2. Each of the at least one driving chip 02 may send the return data to the controller 01 through the first signal line L1. The controller 01 may send a control signal to each of the at least one driving chip 02 through the second signal line L2. In this way, the conflict between the two signal lines in the timing sequence of data transmission can be avoided, and real-time data transmission can also be achieved. FIG. 2 is illustrated by taking the case that the plurality of driving chips 02 is connected to the controller 01 through the first signal line L1 and the second signal line L2 as an example, which will not be limited herein.

Figure 3:
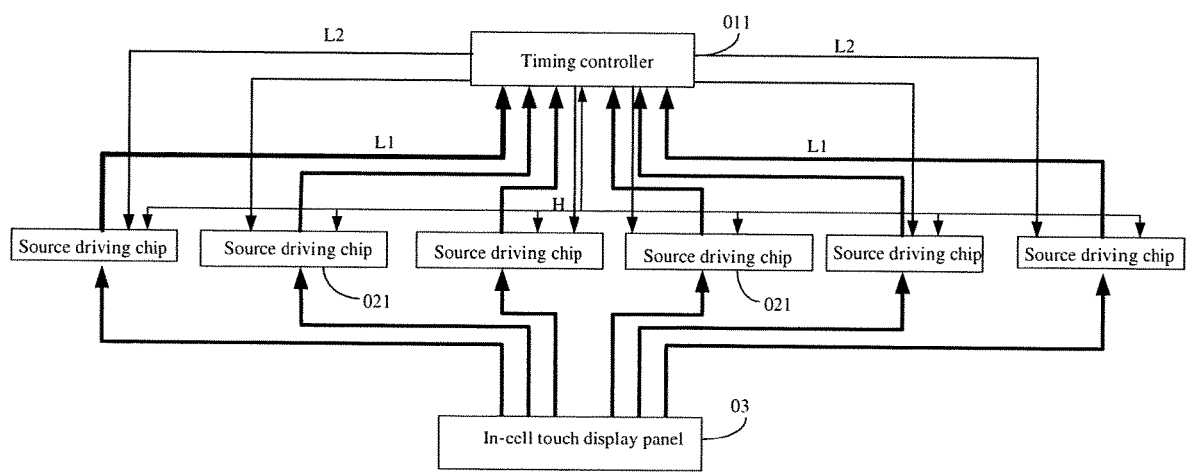
FIG. 3 is a schematic diagram of an application environment of yet another data transmission method according to an exemplary embodiment of the present disclosure.

The driving chip may be a source driving chip or a gate driving chip. The controller may be any one of a timing controller, a System on Chip (SOC), and a Microcontroller Unit (MCU) integrated in the timing controller. FIG. 3 is illustrated by taking the case that the controller is the timing controller 011 and the driving chip is the source driving chip 021 as an example. As shown in FIG. 3, the timing controller 011 is connected to a plurality of source driving chips 021 respectively through a plurality of second signal lines L2 in a one-to-one correspondence manner, and is connected to chips that have a return data transmission function (that is capable of transmitting return data) among the plurality of source driving chips 021 respectively through at least one first signal line L1 in a one-to-one correspondence manner. Optionally, the timing controller 011 is further connected with a third signal line H. The plurality of source driving chips 021 is connected in parallel and connected to the third signal line H. The third signal line may be configured to identify a level state. For example, a level state of the pins of the source driving chip is set to a high level or a low level through the third signal line H. It is assumed in FIG. 3 that the plurality of source driving chips 021 is connected in parallel and connected to the timing controller 011 through the first signal line, the second signal line, and the third signal line, and the plurality of source driving chips 021 is respectively connected to the in-cell touch display panel 03, which will not be limited in the embodiment of the present disclosure.

The first signal line and the second signal line may be high-speed signal lines, and the third signal line may be a low-speed signal line. It should be noted that if a signal line for connecting the in-cell touch display panel 03 and the driving chip 02 is a fourth signal line, the fourth signal line may also be a high-speed signal line. In this case, a signal transmission rate of the first signal line, a signal transmission rate of the second signal line, and a signal transmission rate of the fourth signal line are all higher than the signal transmission rate of the third signal line. For example, the first signal line, the second signal line, and the fourth signal line are differential signal lines, and the third signal line is an ordinary signal line (not a differential signal line).

When there is a plurality of driving chips with a return data transmission function, the plurality of driving chips may be respectively connected to a plurality of touch signal output terminals of the in-cell touch display panel.

Figure 4:
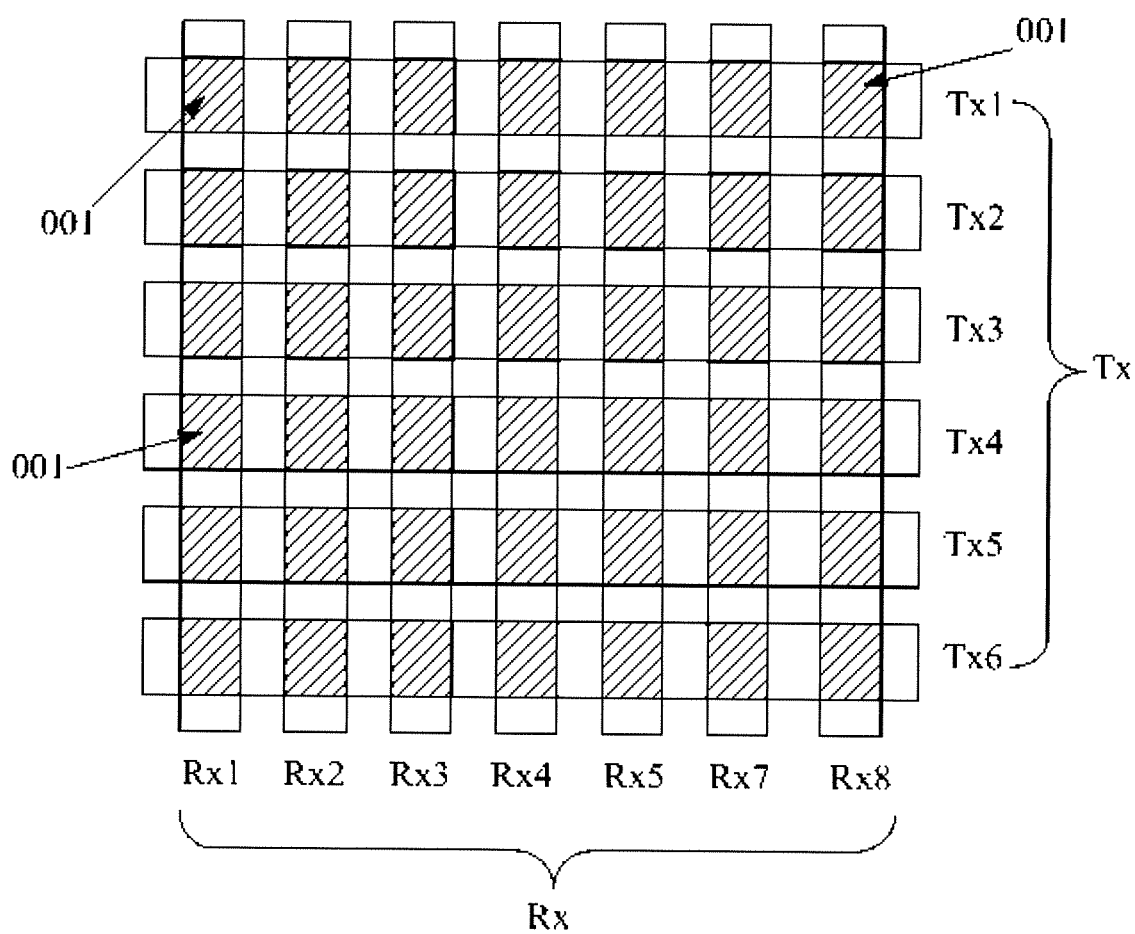
FIG. 4 is a schematic structural diagram of a touch function layer shown according to an exemplary embodiment.

The touch function layers of the in-cell touch display panel are divided into mutual-capacitive touch function layers and self-capacitive touch function layers according to different touch principles. As shown in FIG. 4, the mutual-capacitive touch function layer includes a plurality of touch driving lines Tx arranged in the lateral direction (i.e., the direction of a row of pixels in the panel), and a plurality of touch sensing lines Rx arranged in the longitudinal direction (i.e., the direction of a column of pixels in the panel). Each touch driving line Tx intersects with one touch sensing line Rx to form a touch unit 001, wherein one touch driving line Tx corresponds to one row of touch units 001, and one touch sensing line Rx corresponds to one column of touch units 001. It should be noted that FIG. 4 is illustrated by taking a total of eight touch sensing lines Rx and a total of 56 touch driving lines Tx as examples. The number of Rx and Tx will not be limited in the embodiment of the present disclosure.

When the mutual-capacitive touch function layer implements a touch function, the in-cell touch display panel sequentially inputs a touch scanning signal to the touch driving lines Tx in the mutual-capacitive touch function layer, and collects a sensing signal on each touch sensing line Rx. The position of a touch point (such as the position of the touch unit 001 being touched) is determined according to the sensing signal on each touch sensing line Rx. The above touch function may be implemented by a touch driving integrated circuit (IC) in the in-cell touch display panel. That is, the touch driving IC may be configured to input touch scanning signals and collect sensing signals, and determine the position of the touch point.

For the mutual-capacitive touch function layer, in an optional implementation manner, the touch signal output terminal may be a terminal of the touch sensing line Rx. In this case, each driving chip having a return data transmission function may be connected to at least one touch sensing line Rx (for example, each driving chip having a return data transmission function may be connected to a group of touch sensing lines, and each group of touch sensing lines include at least two adjacent touch sensing lines). In the case, the driving chip shares some of the functions of the touch driving IC. In another optional implementation manner, each driving chip having a return data transmission function may be connected to the touch driving IC, that is, the touch signal output terminal is a terminal of the touch driving IC. In this case, the driving chip achieves fast data return of the touch driving IC to the controller. Optionally, the driving chip is connected to the touch signal output terminal through a differential signal line.

Figure 5:
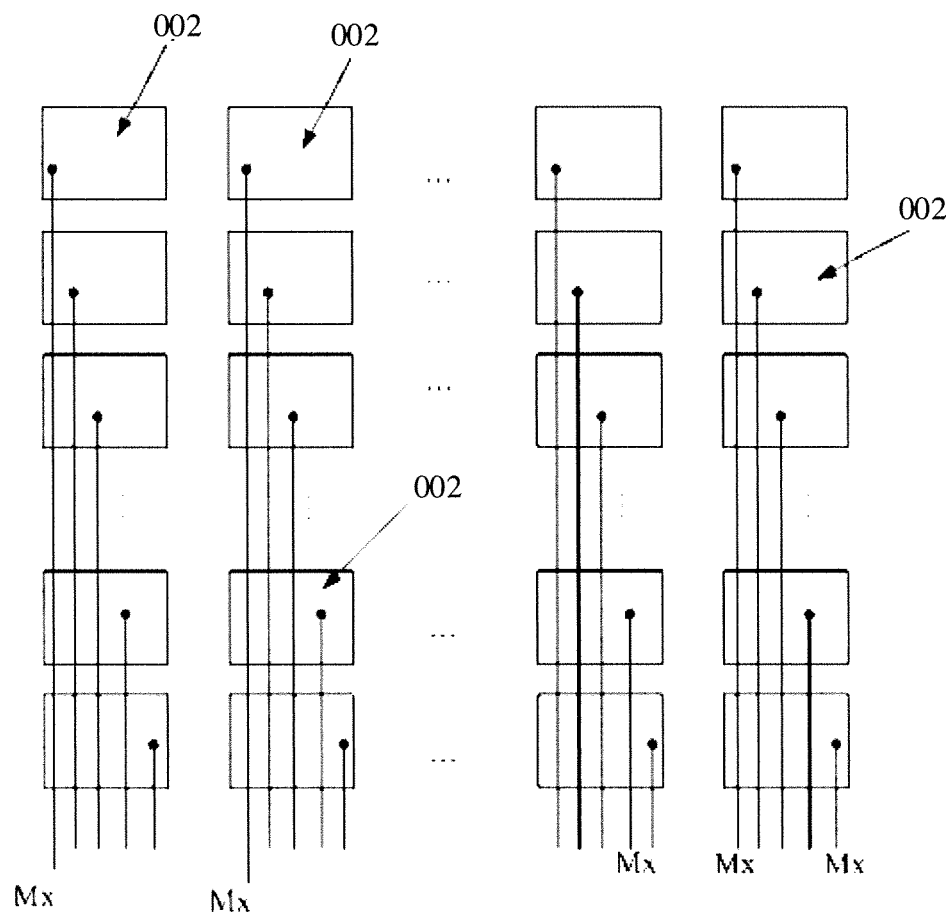
FIG. 5. is a schematic structural diagram of another touch function layer shown according to an exemplary embodiment.

As shown in FIG. 5, the mutual-capacitive touch function layer generally includes single-layer Indium Tin Oxide (ITO). The single-layer ITO includes a plurality of touch units 002 arranged in an array, wherein each touch unit 002 is connected to a touch line Mx, that is, one touch line Mx corresponds to one touch unit.

When the self-capacitive touch function layer implements the touch function, the in-cell touch display panel may simultaneously input a touch scanning signal to each Mx in the self-capacitive touch function layer and collect a sensing signal on each Mx, and determine the position of a touch point (such as the position of the touch unit 002 being touched) according to whether or not the sensing signal on each Mx is the same as a normal sensing signal. The touch function may be implemented by a touch driving IC, that is, the touch driving IC may be configured to input touch scanning signals and collect sensing signals, and determine the position of a touch point.

For the self-capacitive touch function layer, in an optional implementation manner, the touch signal output terminal may be a terminal of the touch line Mx. In this case, each driving chip having a return data transmission function may be connected to at least one touch line Mx (for example, each driving chip having a return data transmission function may be connected to a group of touch lines, and each group of touch lines include at least two adjacent touch lines). In the case, the driving chip shares part of the function of the touch driving IC. In another optional implementation manner, each driving chip having a return data transmission function may be connected to the touch driving IC, that is, the touch signal output terminal is the touch driving IC. In this case, the driving chip achieves fast data return of the touch driving IC to the controller.

Optionally, the driving chip is connected to the touch signal output terminal through a differential signal line.

It should be noted that the touch function layer in the in-cell touch display panel and the display function layer in the display panel may be multiplexed. For example, if the display panel is an OLED display panel, that is, its display function layer is implemented based on OLED, when the touch function layer is a mutual-capacitive touch function layer, at least one of a layer where the touch sensing line is located and a layer where the touch driving line is located is multiplexed with an electrode layer of the OLED, wherein the electrode layer may be one of a cathode layer and an anode layer. When the touch function layer is a self-capacitive touch function layer, a layer where a touch line is located is multiplexed with the electrode layer of the OLED, wherein the electrode layer may be one of a cathode layer and an anode layer. If the display panel is an LCD display panel, that is, its display function layer is implemented based on a liquid crystal layer, as well as a pixel electrode layer and a common electrode layer for controlling the liquid crystal layer. When the touch function layer is a mutual-capacitive touch function layer, at least one of a layer where a touch sensing line is located and a layer where a touch driving line is located is multiplexed with an electrode layer in the display function layer, wherein the electrode layer may be one of a pixel electrode layer and a common electrode layer. When the touch function layer is a self-capacitive touch function layer, a layer where a touch line is located is multiplexed with the electrode layer in the display function layer, wherein the electrode layer may be one of a pixel electrode layer and a common electrode layer.

It is worth noting that after the touch function layer in the in-cell touch display panel is multiplexed with the display function layer in a display panel, the touch function layer and the display function layer are driven in a time-sharing manner to ensure that the two functional layers do not interfere with each other.

It should be noted that the in-cell touch display panel may further include a sensor, and the sensor includes at least one of a temperature sensor, a position sensor, an infrared sensor, and/or an ultrasonic sensor. The corresponding return data includes data collected by the sensor. In an optional embodiment, each driving chip having a data return function may be respectively connected to a touch signal output terminal and a signal output terminal of the sensor, and the corresponding returned state data includes: touch data and data collected by the sensor. In another optional embodiment, a part of the driving chips in the display device is connected to the touch signal output terminal, and the returned state includes touch data. The other part of the driving chips is connected to the signal output terminal of the sensor, and the returned state data includes the data collected by the sensor. Optionally, the driving chip is connected to the signal output terminal of the sensor through a differential signal line.

Figure 6:
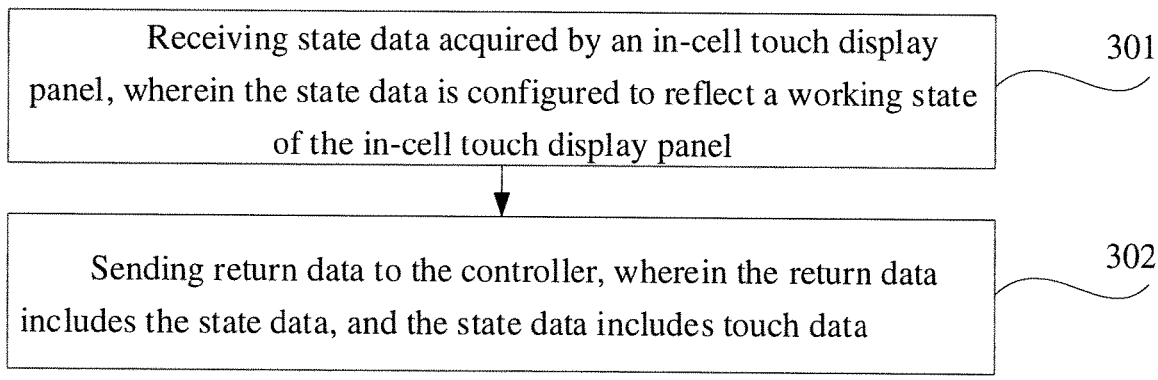
FIG. 6 is a flowchart of a data transmission method shown according to an exemplary embodiment.

An embodiment of the present disclosure provides a data transmission method. As shown in FIG. 6, the method is applied to a target driving chip in a display device as shown in any one of FIGS. From 1 to 3. The target driving chip is one of a plurality of driving chips. Exemplarily, the target driving chip may be any one of the plurality of driving chips, or a specified one of the plurality of driving chips, which will not be limited in the embodiment of the present disclosure. The target driving chip is connected to the controller and the in-cell touch display panel respectively. The method includes the following steps.

In Step 301, state data acquired by an in-cell touch display panel is received. The state data is configured to reflect a working state of the in-cell touch display panel.

In Step 302, return data is sent to the controller. The return data includes the state data, and the state data includes touch data.

In summary, according to the data transmission method provided by the embodiment of the present disclosure, the target driving chip can receive the state data acquired by the in-cell touch display panel and transmit the state data to the controller through the postback data, thereby enriching the functions of the driving chips and increasing the utilization rate of the driving chips.

Figure 7:
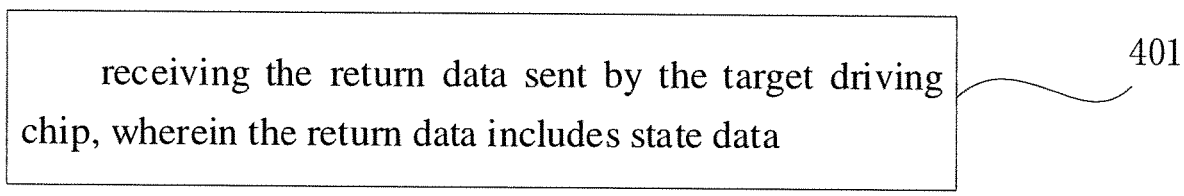
FIG. 7 is a flowchart of another data transmission method shown according to an exemplary embodiment.

An embodiment of the present disclosure provides a data transmission method. As shown in FIG. 7, the method is applied to a controller in a display device as shown in any one of FIGS. from 1 to 3. The display device includes a controller, a plurality of driving chips, and an in-cell touch display panel. The method includes the following step.

In Step 401, the return data sent by the target driving chip is received. The return data includes state data.

The target driving chip is respectively connected to the controller and the in-cell touch display panel. The target driving chip is one of a plurality of driving chips. Exemplarily, the target driving chip may be any one of the plurality of driving chips, or a specified one of the plurality of driving chips, which will not be limited in the embodiment of the present disclosure.

The return data is sent by the target driving chip to the controller after the target driving chip receives the state data acquired by the in-cell touch display panel. The state data is configured to reflect a working state of the in-cell touch display panel, and includes touch data.

In summary, according to the data transmission method provided by the embodiment of the present disclosure, the target driving chip can receive the state data acquired by the in-cell touch display panel and transmit the state data to the controller through the return data, thereby enriching the functions of the driving chips and increasing the utilization rate of the driving chips.

Figure 8:
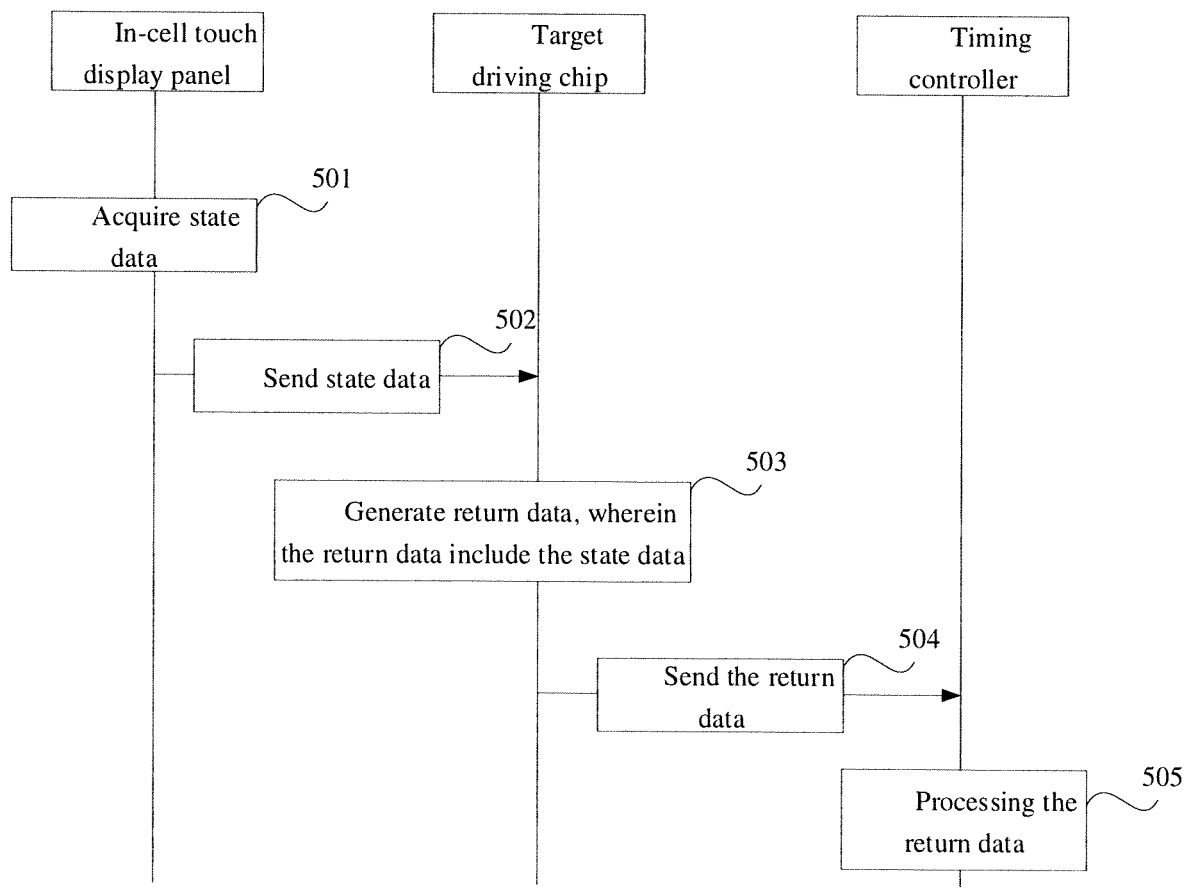
FIG. 8 is a flowchart of yet another data transmission method shown according to an exemplary embodiment.

An embodiment of the present disclosure provides a data transmission method. As shown in FIG. 8, the method is applied to a display device as shown in any one of FIGS. from 1 to 3. The display device includes a controller, a plurality of driving chips, and an in-cell touch display panel. The target driving chip is one of a plurality of driving chips, and is respectively connected to the controller and the in-cell touch display panel. The method includes the following steps.

In step 501, the in-cell touch display panel acquires state data.

The state data is configured to reflect a working state of the in-cell touch display panel. Exemplarily, the state data may include touch data. The touch data includes at least one of touch position data and touch pressure data. The touch position data is configured to indicate the position of a touch point, and may be a coordinate value. The touch pressure data is configured to indicate a pressure on the touch point, and may be a pressure value.

The state data may further include first indication information indicating whether the working state of the in-cell touch display panel is abnormal. The first indication information includes the following two types: normal indication information and abnormal indication information. The normal indication information is configured to indicate that the working state of the in-cell touch display panel is not abnormal (that is, normal). The abnormal indication information is configured to indicate that the working state of the in-cell touch display panel is abnormal. The first indication information may be represented by a preset character, for example, 0 indicates the normal indication information, and 1 indicates the abnormal indication information.

Optionally, when the in-cell touch display panel includes a sensor, the target driving chip is connected to a signal output terminal of the sensor. The state data may further include data collected by the sensor. In this case, in Step 501, the in-cell touch display panel needs to acquire not only the above-mentioned touch data, but also the data collected by the sensor.

Exemplarily, the sensor includes at least one of a temperature sensor, a position sensor, an infrared sensor, and an ultrasonic sensor. When the sensor includes a temperature sensor, the data collected by the sensor may include temperature data. When the sensor includes the position sensor, the data collected by the sensor may include position data. When the sensor includes the infrared sensor, the data collected by the sensor may include infrared data. When the sensor includes the ultrasonic sensor, the data collected by the sensor may include ultrasonic data.

In step 502, the in-cell touch display panel sends the state data to the target driving chip.

In the embodiment of the present disclosure, the target driving chip may establish a connection with the in-cell touch display panel in a specified manner. The in-cell touch display panel may send the state data to the target driving chip through this connection. For example, this connection may be a circuit connection, a data line connection, or a Flexible Printed Circuit (FPC) connection, which will not be limited in the embodiment of the present disclosure.

When the state data in step 501 includes the touch data and the data collected by the sensor, in step 502, the in-cell touch display panel may send the return data (including the touch data) of the data collected by the sensor to the target driving chip.

In Step 503, the target driving chip generates return data. The return data includes the state data.

After receiving the state data acquired by the in-cell touch display panel, the target driving chip can generate the return data based on the state data. In the embodiment of the present disclosure, the state data may have a plurality of forms. For different forms of state data, the target driving chip may have different processing modes. The embodiment of the present disclosure will be described by taking the following two forms of state data as examples.

In the first form of state data, the state data may be raw data, also called original data. That is, in step 502, after acquiring the state data, the in-cell touch display panel directly sends the state data to the target driving chip, without processing the state data. Of course, the state data needs to be sent in a format agreed with the target driving chip.

The raw state data is usually state data in a form of an analog signal. The target driving chip may directly send the state data to the controller as return data, or process the state data to generate return data, and then send the return data to the controller. The processing procedure includes that: the target driving chip performs analog-to-digital conversion, of the state data in a form of analog signal to obtain the state data in a form of a digital signal; then, the target driving chip generates return data, the return data including the state data in a form of digital signal. The process of performing analog-to-digital conversion of the state data in a form of analog signal may be implemented by an Analog-to-Digital Converter (ADC) integrated in the target driving chip.

In the second form of state data, the state data may be processed data. That is, in step 502, after acquiring the state data, the in-cell touch display panel processes the state data, and sends the processed state data to the target driving chip. Of course, the state data needs to be sent in a format agreed with the target driving chip.

The processed state data is usually state data in a form of a digital signal. The target driving chip may directly send the state data to the controller as return data.

Further, in addition to the state data, the return data may also include information of the target driving chip. In this way, the target driving chip can achieve returning its own information, thereby further enriching the functions of the target driving chip.

For example, the return data includes at least one of working mode data of the target driving chip, and second indication information indicating whether the working state of the driving chip is abnormal. Of course, the information of the target driving chip may also include other information, such as a data processing rate of the driving chip, and the like.

The working mode data is configured to indicate a working mode of the target driving chip, and the working mode is configured to indicate a current data processing rate of the target driving chip. For example, the working mode of the target driving chip includes a low-speed working mode or a high-speed working mode. The data processing rate in the high-speed working mode is greater than that in the low-speed working mode. The target driving chip may dynamically switch the working mode according to its specific usage scenario. Optionally, the target driving chip may determine its working mode according to the amount of data that needs to be processed currently. For example, there are m processing modules on the target driving chip in total, and the amount of data that needs to be processed currently requires to use n processing modules. When the number of n is greater than a preset number threshold, the target driving chip may determine that it is in the high-speed working mode; and when the number of n is not greater than the preset number threshold, the target driving chip may determine that it is in the low-speed working mode. Alternatively, when n/m is greater than a preset ratio threshold, the target driving chip determines that it is in the high-speed working mode; when n/m is not greater than the preset ratio threshold, the target driving chip determines that it is in the low-speed working mode. The above m is a positive integer greater than 1. The m processing chips may include at least one of an analog-to-digital conversion chip, a computing chip, and a memory chip.

The second indication information indicating whether the working state of the target driving chip is abnormal includes the following two types: normal indication information and abnormal indication information. The normal indication information is configured to indicate that the working state of the driving chip is not abnormal (i.e., normal). The abnormal indication information is configured to indicate that the working state of the driving chip is abnormal. The second indication information may be represented by a preset character, for example, 0 indicates the normal indication information, and 1 indicates the abnormal indication information.

In step 504, the target driving chip sends the return data to the controller.

In the embodiment of the present disclosure, the controller establishes a communication connection with the target driving chip. As shown in any one of FIGS. from 1 to 3, the controller may be connected to the target driving chip through a first signal line, a second signal line, or a third signal line. Generally, the controller may transmit a control signal through the second signal line to achieve fast and efficient control of the target driving chip. Exemplarily, the second signal line is a high-speed signal line, such as a second differential signal line.

The first signal line may be a single bus which uses Manchester encoding, or may be a dual bus, such as a Serial Peripheral Interface (SPI) bus or a two-wire serial bus (I2C bus). However, a signal transmission rate of the single bus is usually 100 kHz (kilohertz), a transmission rate of the SPI bus can reach 16 MHz, and a transmission rate of the two-wire serial bus can reach 400 kHz. The transmission rates of these three forms of signal lines are relatively small, which cannot realize the transmission of large data volume. If a large amount of data needs to be transmitted or data needs to be acquired in real time, packet loss occurs easily.

Therefore, in the embodiment of the present disclosure, the first signal line may also be a high-speed signal line, such as a first differential signal line. Differential signal lines can achieve fast and real-time data return, and support the transmission of large data volume. Especially when the amount of the state data is relatively large, a better transmission effect can be achieved, thereby ensuring that the controller can timely respond and control. For example, when the state data includes touch data, the first differential signal can transmit the complete touch data to the controller fast, such that the controller may fast respond to the touch data. When the state data includes temperature data collected by the temperature sensor, the first differential signal can transmit the complete temperature data to the controller fast, such that the controller can perform quick processing based on the temperature data. For example, when the temperature is relatively high, a cooling process is performed.

Further, when the target driving chip is connected to the controller through the first differential signal line and the second differential signal line at the same time (that is, the target driving chip is connected to the controller not only through the first differential signal line, but also through the second differential signal line), the target driving chip may receive a control signal sent by the controller through the second differential signal line, and perform an operation indicated by the control signal. Meanwhile, the target driving chip may send return data to the controller in real time through the first differential signal line. In this way, because the two differential signal lines are provided between the target driving chip and the controller, the signal transmission and the signal reception are independent of each other and do not affect each other, without timing conflict, thereby achieving real-time transmission of the return data. Each time after the in-cell touch display panel acquires the state data, the state data is directly transmitted to the target driving chip. After the target driving chip generates return data based on the state data, the return data is then transmitted to the controller directly through the first differential signal line. This process can ensure the timeliness of the state data and achieve that the controller can acquire and process the state data in a timely manner.

The differential signal lines include two signal lines for performing signal transmission in a differential transmission manner. Differential transmission is a signal transmission technology, which is different from the traditional method with one signal line (the signal line may be a clock signal line) and one ground line. The differential transmission refers to the transmission of signals on both signal lines. The signals transmitted on the two signal lines are identical in amplitude, but opposite in phase. The signals transmitted on the two signal lines are differential signals. The difference between the signals on these two signal lines may be configured to characterize signal specifically transmitted by the differential signal lines. Exemplarily, when the two signal lines are working normally, their loaded levels are opposite, and the signals loaded on the two signal lines are Vo+ and Vo−, respectively. Exemplarily, if the difference between the two signals is positive, it characterizes the signal specifically transmitted by the differential signal lines as 1; and if the difference between the two signals is negative, it characterizes the signal specifically transmitted by the differential signal lines as 0. Compared with traditional signal lines, the differential signal lines can save resources without using signal lines and ground lines, can easily identify small signals due to high accuracy, show very strong Electro Magnetic Interference (EMI) capability, and have a high signal transmission speed, thereby having a wide application prospect.

Figure 9:
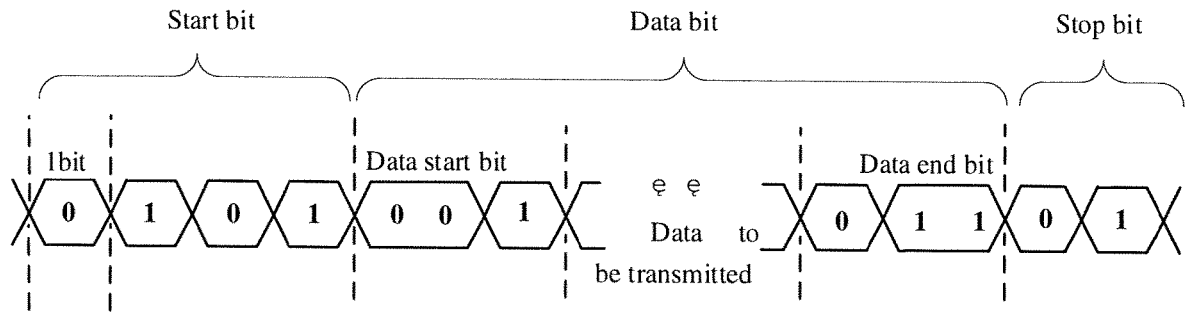
FIG. 9 is a schematic structural diagram of a data packet transmitted on a first differential signal line according to an exemplary embodiment.

The signal transmitted on the first differential signal line is transmitted in a form of a data packet. As shown in FIG. 9, FIG. 9 is a schematic structural diagram of a data packet transmitted on the first differential signal line. The structure of other data packets on the first differential signal line may also refer to this data packet. This data packet includes a start bit, a data bit, and a stop bit that are sequentially arranged. The start bit is configured to indicate the start of data transmission, and may include a start identifier. The data bit is configured to carry data to be transmitted. The stop bit is configured to indicate the end of data transmission, and may include a stop identifier. It can be seen from FIG. 7 that the start bit, data bit, and the stop bit are all represented by a difference value of 0 or 1, and each difference value occupies 1 bit. The data bit may include a data start bit, data to be transmitted, and a data end bit (also called a data destination bit). The data start bit is configured to indicate an actual beginning position of the data bit. The data end bit is configured to indicate an actual ending position of the data bit. Further, the data bit may further include a data check bit (not shown in FIG. 9), which is configured to perform data check on the data to be transmitted and improve the reliability of data transmission.

Figure 10:
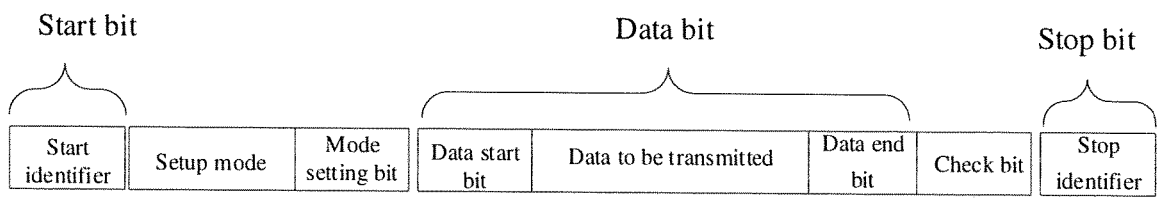
FIG. 10 is a schematic structural diagram of a data packet transmitted on another first differential signal line according to an exemplary embodiment.

Optionally, as shown in FIG. 10, each data packet further includes: a set-up mode bit and a mode setting bit which are sequentially arranged between the start bit and the data bit, and a check bit between the data bit and the stop bit. The set-up mode bit is configured to indicate a mode of the mode setting of data packet, for example, through software mode or hardware mode. The software mode refers to setting through signaling transmission. The hardware mode refers to setting through setting a chip pin high or low. Further, the setup mode bit may also include some parameters that reflect the mode setting of data packet, such as initial setup parameters, setup parameters during transmission, or setup parameters at the end of transmission. The mode setting bit is configured to indicate a mode of the data packet. The mode of the data packet may include a request mode or a response mode. The check bit is used for data check.

In step 505, the controller processes the return data.

As can be seen from Step 503, the return data may include state data, and may also include information of the driving chip. After receiving the return data sent by the target driving chip, the controller may perform corresponding processing, such as data forwarding, response, or storage, according to different data contents of the return data.

In the embodiment of the present disclosure, the corresponding processing actions are described by taking the following types of data content of the return data as examples.

First, the return data includes state data. The state data includes touch data. The controller may store the touch data, or respond to the touch data, or forward the touch data to a designated processor, such as a Central Processing Unit (CPU). When the controller is a timing controller, an MCU may be integrated in the timing controller, and the controller may forward the touch data to the MCU.

Optionally, the state data further includes: first indication information indicating whether the working state of the in-cell touch display panel is abnormal. Then when the first indication information indicates that the working state of the display panel is abnormal, that is, the first indication information is abnormal indication information, the controller may issue alarm information, or forward the first indication information to a designated processor, such as a CPU. When the controller is a timing controller, an MCU may be integrated in the timing controller, and the controller may forward the first indication information to the MCU.

Optionally, the state data further includes data collected by a sensor. The controller may store the data collected by the sensor, or forward the data collected by the sensor to a designated processor, such as a CPU. When the controller is a timing controller, an MCU may be integrated in the timing controller, and the controller may forward the data collected by the sensor to the MCU.

Optionally, the return data further includes information of the driving chip. The information of the driving chip includes working mode data of the driving chip. Then, the controller can save the working mode data.

Optionally, the return data further includes information of the driving chip. The information of the driving chip includes second indication information indicating whether the working state of the driving chip is abnormal. Then, when the second indication information indicates that the working state of the driving chip is abnormal, that is, the second indication information is abnormal indication information, the controller may issue alarm information, or forward the second indication information to a designated processor, such as a CPU. When the controller is a timing controller, an MCU may be integrated in the timing controller, and the controller may forward the second indication information to the MCU.

Since there may be a plurality of data contents in the return data, the controller may perform one or more of the above processing actions based on different data contents, which will not be limited in the embodiment of the present disclosure. In addition, the processor may also generate a corresponding control signal based on the data content in the return data, and send the control signal to the target driving chip to control the target driving chip.

It should be noted that, on the basis of the traditional controller, the controller may also be set up with a dedicated processing module to receive the return data transmitted by the target driving chip, and may also send a control signal or response signal corresponding to the return data to the target driving chip through the processing module. Of course, the processing module may also send other data, such as configuration data, to the target driving chip, which will not be limited in the embodiment of the present disclosure. In an optional implementation manner, the processing module may send data to the target driving chip through the first differential signal line, that is, the first differential signal line may perform bidirectional data transmission. In another optional implementation manner, the processing module may send data to the target driving chip through an additional third differential signal line, that is, the third differential signal line and the first differential signal line respectively perform unidirectional data transmission, which will not be limited in the embodiment of the present disclosure.

Further, under the control of the controller, the target driving chip may also send a signal, such as a data acquisition request, to the in-cell touch display panel. Therefore, a bidirectional connection may also be established between the target driving chip and the in-cell touch display panel. The bidirectional connection may be implemented by a circuit connection, a data line connection, or an FPC connection that supports bidirectional communication, or may be implemented by two connections that support a unidirectional communication. This bidirectional connection may be a circuit connection, a data line connection, or an FPC connection.

Figure 11:
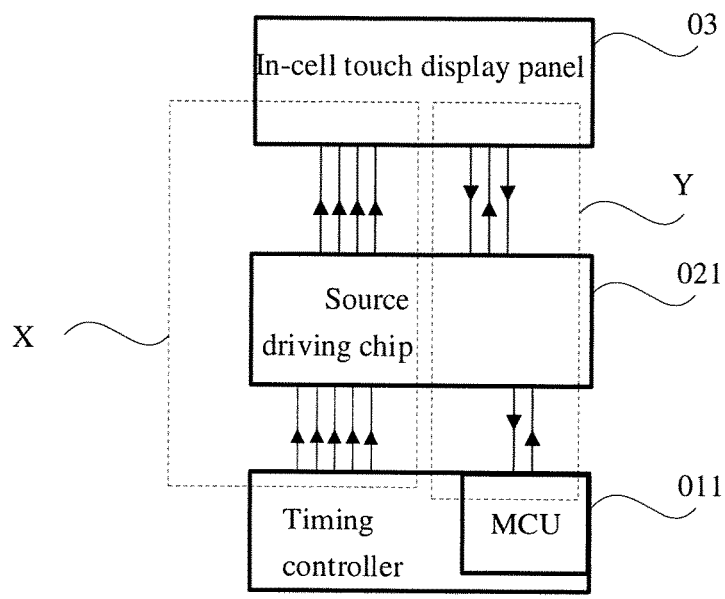
FIG. 11 is a schematic diagram illustrating a connection relationship among an in-cell touch display panel, a target driving chip, and a controller according to an exemplary embodiment.

FIG. 11 is a schematic diagram showing a connection relationship among the in-cell touch display panel, the target driving chip, and the controller. In FIG. 11, assuming that the controller is a timing controller 011, the processing module is an MCU integrated in the controller, and the target driving chip is a source driving chip 021, the connection in an area X is a connection required to implement the basic display function of the in-cell touch display panel; and the connection in an area Y is a connection newly added in the embodiment of the present disclosure. The source driving chip 021 and the in-cell touch display panel 03 can perform bidirectional data transmission. The source driving chip 021 and the timing controller 011 can perform bidirectional data transmission and especially when connected through a differential signal line, can perform real-time and efficient data transmission.

In summary, according to the data transmission method provided by the embodiment of the present disclosure, the target driving chip can receive the state data acquired by the in-cell touch display panel and transmit the state data to the controller through the return data, thereby enriching the functions of the driving chip and increasing the utilization rate of the driving chip. In addition, the data return performed through the first differential signal line can achieve high-speed and real-time data transmission, and the data transmission efficiency is relatively high.

Figure 12:
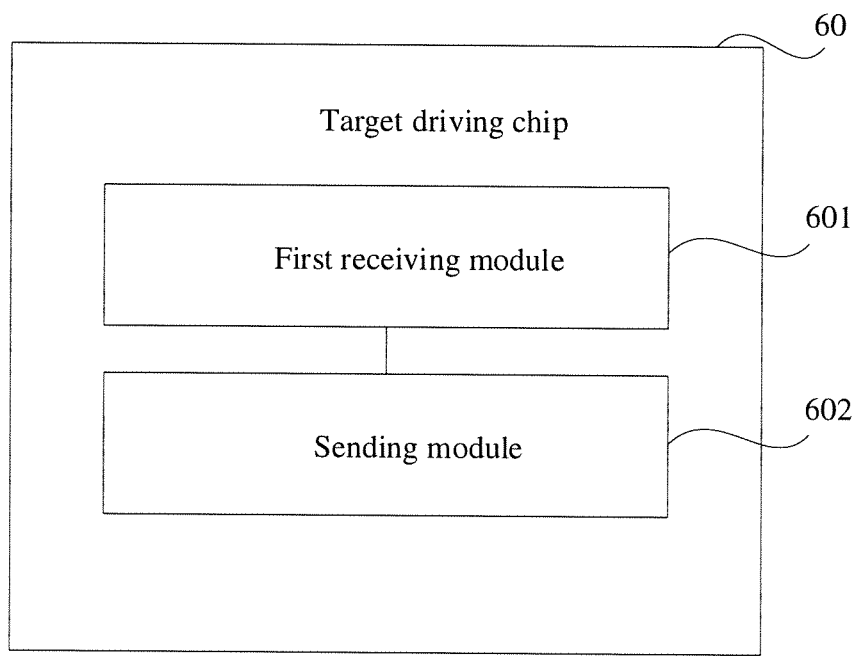
FIG. 12 is a block diagram of a target driving chip shown according to an exemplary embodiment.

An embodiment of the present disclosure provides a target driving chip 60, which, as shown in FIG. 12, is applied to the target driving chip of a display device. The target driving chip is one of a plurality of driving chips of the display device, and is respectively connected to the controller and an in-cell touch display panel. The target driving chip is configured to executes steps to be executed by the target driving chip in the methods provided in the embodiments of the present disclosure. The target driving chip 60 includes:

a first receiving module 601 configured to receive state data acquired by the in-cell touch display panel, the state data being configured to reflect a working state of the in-cell touch display panel and including touch data; and a sending module 602 configured to send return data to the controller, the return data including the state data.

In summary, in the target driving chip provided by the embodiment of the present disclosure, the receiving module can receive the state data acquired by the in-cell touch display panel, and the sending module transmits the state data to the controller through the return data, thereby enriching the functions of the driving chip and increasing the utilization rate of the driving chip.

Optionally, the controller is connected to the driving chip through a first differential signal line.

Figure 13:
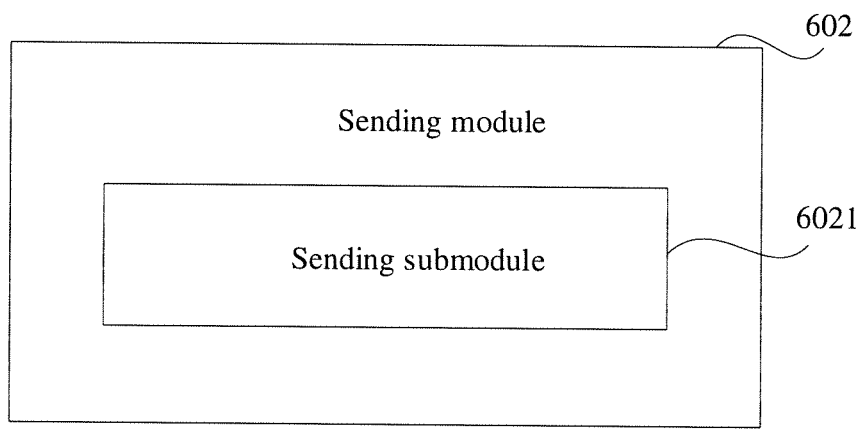
FIG. 13 is a block diagram of a sending module shown according to an exemplary embodiment.

As shown in FIG. 13, the sending module 602 includes:

a sending submodule 6021 configured to send the return data to the controller through the first differential signal line.

Optionally, the sending submodule 6021 is configured to send the return data to the controller through the first differential signal line in a form of a data packet, wherein the data packet includes a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, the data packet further includes: a setup mode bit and a mode setting bit which are arranged between the start bit and the data bit in sequence, and a check bit between the data bit and the stop bit, wherein the setup mode bit is configured to indicate a mode of the mode setting of the data packet, the mode setting bit is configured to indicate a mode of the data packet, the check bit is configured to perform data check, and the mode of the data packet includes a request mode or a response mode.

Figure 14:
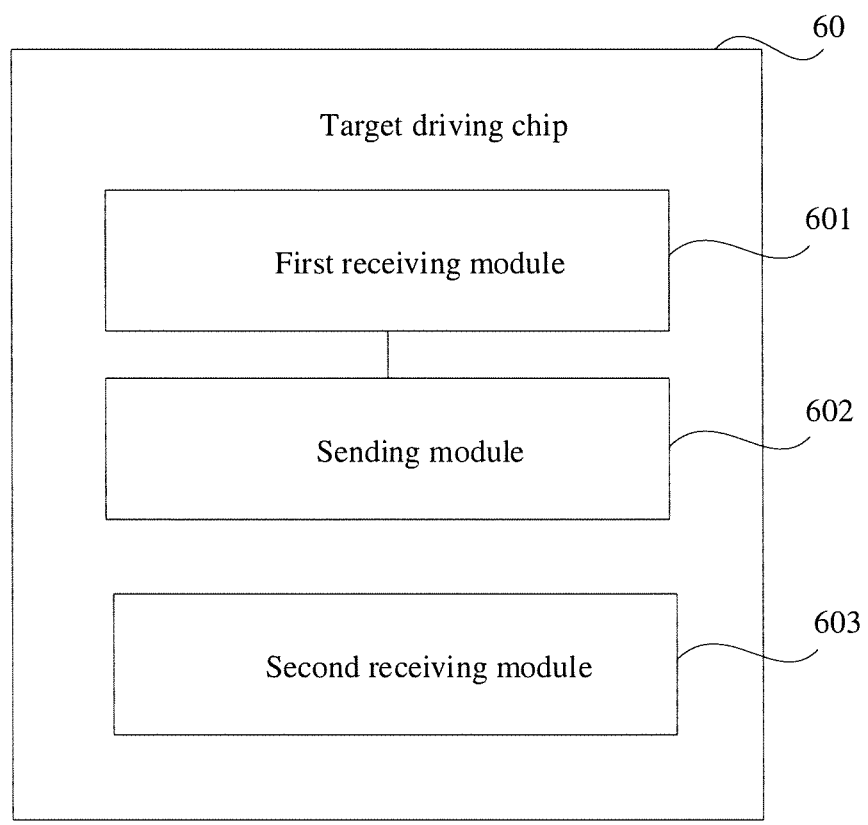
FIG. 14 is a block diagram of another target driving chip shown according to an exemplary embodiment.

Optionally, the controller is further connected to the target driving chip through a second differential signal line. As shown in FIG. 14, the target driving chip 60 further includes:

a second receiving module 603 configured to receive a control signal sent by the controller through the second differential signal line; and the sending module 602 (such as the sending submodule 6021 in the sending module 602) is configured to send the return data to the controller in real time through the first differential signal line.

Optionally, the touch data includes at least one of touch position data and touch pressure data.

Optionally, the return data further includes at least one of first indication information, working mode data of the driving chip, and second indication information. The first instruction information is configured to indicate whether a working state of the in-cell touch display panel is abnormal. The second indication information is configured to indicate whether a working state of the target driving chip is abnormal.

Figure 15:
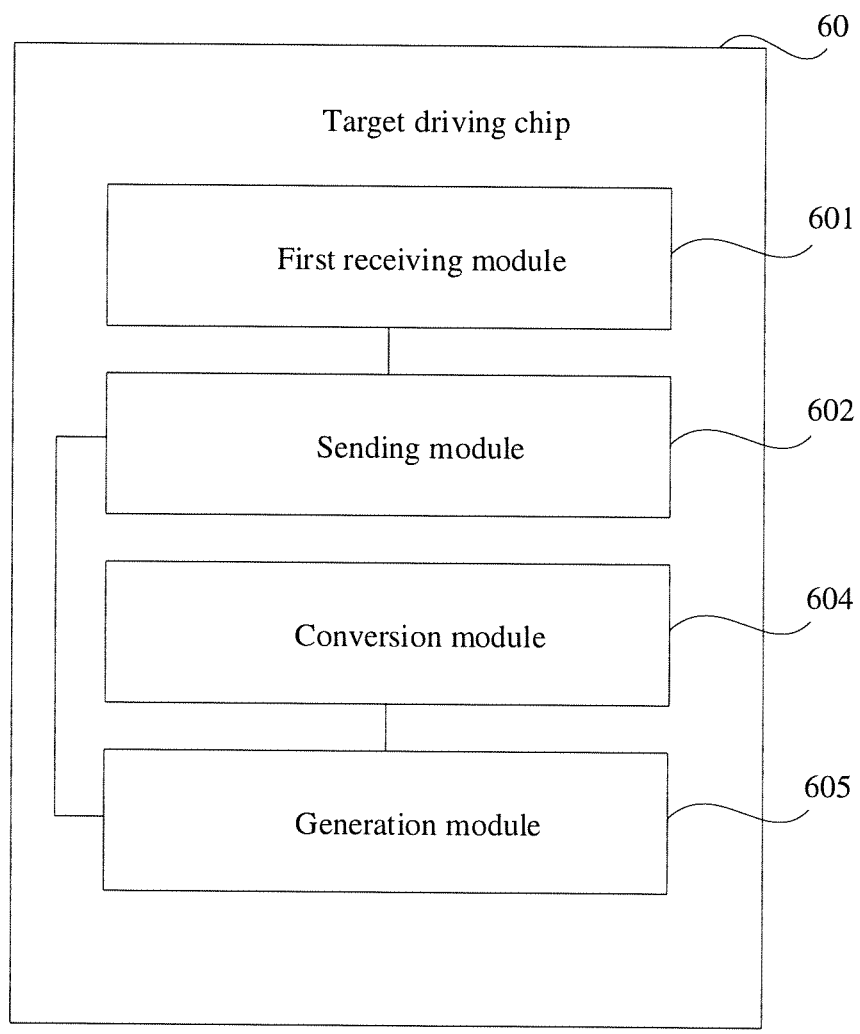
FIG. 15 is a block diagram of yet another target driving chip shown according to an exemplary embodiment.

Optionally, as shown in FIG. 15, the target driving chip 60 further includes:

a conversion module 604 configured to perform analog-to-digital conversion on the state data in the form of an analog signal prior to sending the postback data to the controller, to obtain the state data in a form of a digital signal; and a generation module 605 configured to generate the return data, the return data including the state data in the form of a digital signal.

Optionally, the driving chip is a source driving chip or a gate driving chip. The in-cell touch display panel is an OLED display panel, a quantum dot display panel, a micro light-emitting diode display panel or a liquid crystal display panel integrated with a touch function layer.

The controller is any one of a timing controller, a system chip SOC, and a micro control unit (MCU) integrated in the timing controller.

Optionally, the in-cell touch display panel includes a sensor. The first receiving module 601 is configured to receive the touch data and data collected by the sensor.

In summary, in the target driving chip provided by the embodiment of the present disclosure, the receiving module can receive the state data acquired by the in-cell touch display panel, and the sending module transmits the state data to the controller through the postback data, thereby enriching the functions of the driving chip and increasing the utilization rate of the driving chip.

Figure 16:
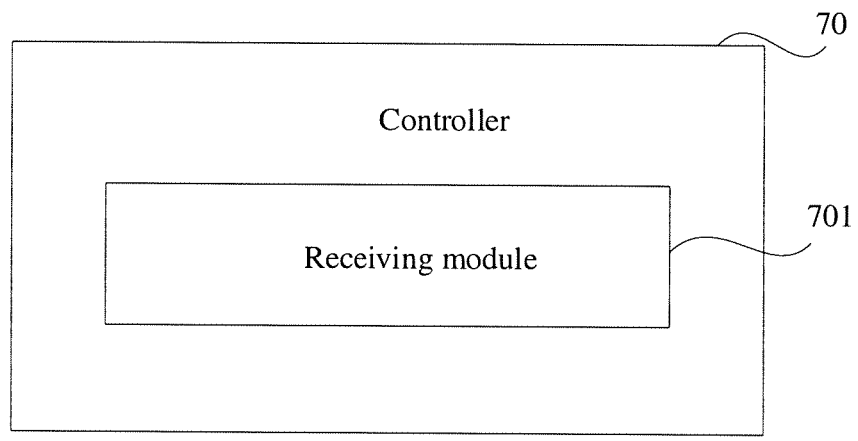
FIG. 16 is a block diagram of a controller shown according to another exemplary embodiment.

An embodiment of the present disclosure provides a controller 70. The controller is configured to executes steps to be executed by the controller in the methods provided in the embodiments of the present disclosure. Exemplarily, as shown in FIG. 16, the controller 70 includes:

a receiving module 701 configured to receive postback data sent by a target driving chip, the postback data including state data.

The target driving chip is one of a plurality of driving chips of a display device, and is respectively connected to the controller and the in-cell touch display panel. The postback data is sent by the target driving chip to the controller after the target driving chip receives the state data acquired by the in-cell touch display panel, the state data being configured to reflect a working state of the in-cell touch display panel and including touch data.

In summary, the embodiment of the present disclosure provides a controller. The target driving chip can receive the state data acquired by the in-cell touch display panel and transmit the state data to the receiving module of the controller through the return data, thereby enriching the functions of the driving chip and increasing the utilization rate of the driving chip.

Figure 17:
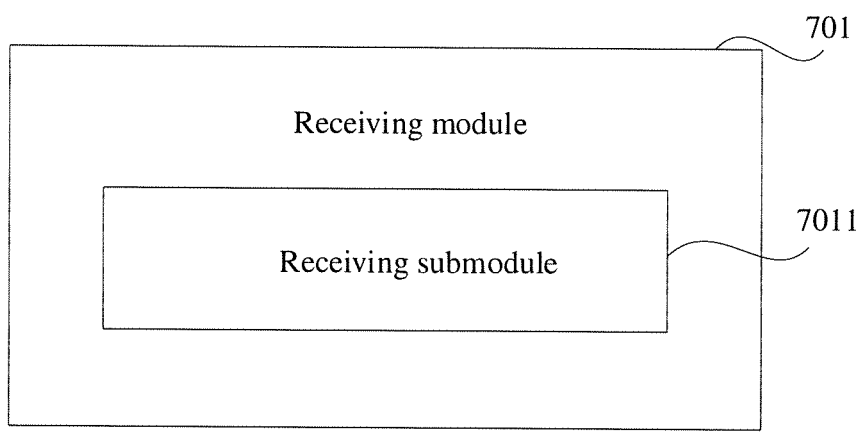
FIG. 17 is a block diagram of a receiving module shown according to another exemplary embodiment.

Optionally, the controller is connected to the driving chip through a first differential signal line. As shown in FIG. 17, the receiving module 701 includes:

a receiving submodule 7011 configured to receive the return data sent by the target driving chip through the first differential signal line.

Figure 18:
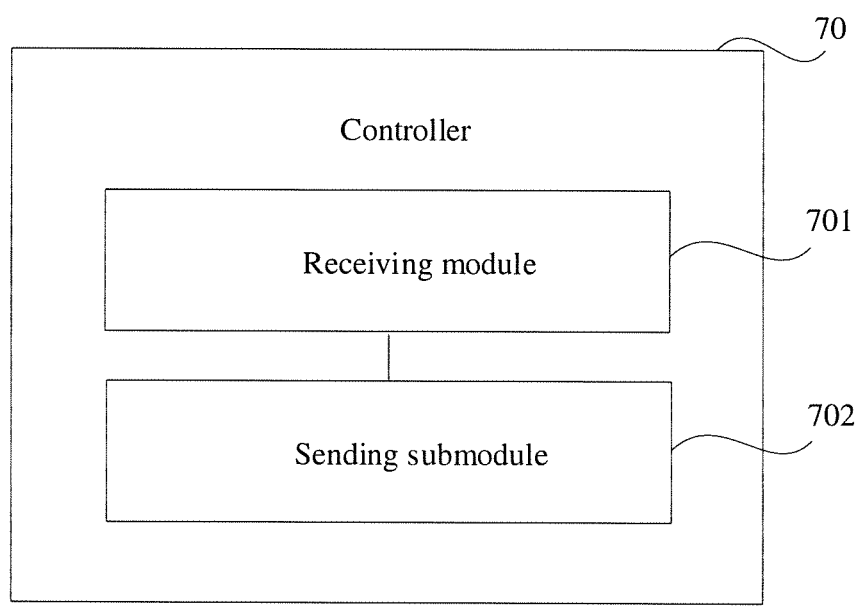
FIG. 18 is a block diagram of another controller shown according to another exemplary embodiment.

Optionally, as shown in FIG. 18, the controller is further connected to the target driving chip through a second differential signal. The controller 70 further includes:

a sending module 702 configured to send a control signal to the target driving chip through the second differential signal line; and a receiving submodule 7011 configured to receive the return data sent by the target driving chip in real time through the first differential signal line.

Optionally, the receiving submodule 7011 is configured to receive the return data transmitted in a form of a data packet through the first differential signal line, the data packet including a start bit, a data bit, and a stop bit which are arranged in sequence, wherein the start bit is configured to indicate the start of data transmission, the data bit is configured to carry data to be transmitted, and the stop bit is configured to indicate the end of data transmission.

Optionally, each data packet further includes: a setup mode bit and a mode setting bit which are arranged between the start bit and the data bit in sequence, and a check bit between the data bit and the stop bit.

The setup mode bit is configured to indicate a mode of the mode setting of the data packet, the mode setting bit is used to indicate a mode of the data packet, the check bit is configured to perform data check, and the mode of the data packet includes a request mode or a response mode.

Optionally, the state data further includes first indication information indicating whether the working state of the in-cell touch display panel is abnormal. The return data further includes at least one of the first indication information, working state data of the driving chip, and the second indication information. The second indication information is configured to indicate whether the working state of the target driving chip is abnormal.

Optionally, the in-cell touch display panel includes a sensor. The state data further includes data collected by the sensor.

Optionally, the touch data includes at least one of touch position data and touch pressure data.

Optionally, the return data further includes at least one of the working mode data of the driving chip and the second indication information indicating whether the working state of the driving chip is abnormal.

It should be understood that the controller and target driving chip embodiments described above are merely illustrative. For example, the division of the modules and submodules in the controller and the target driving chip is only a logical function division. In actual implementation, there may exist other division manners. For example, various functional modules in various embodiments of the present disclosure may be integrated into one module, or exist independently, or two or more of the modules are integrated into one module. The above integrated modules may be implemented in a form of hardware, or in a form of hardware and software functional modules.

Figure 19:
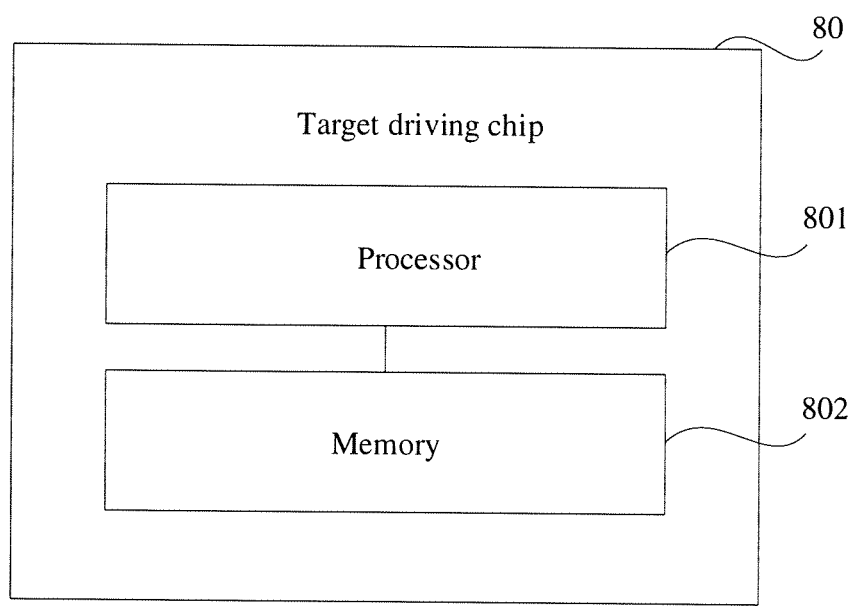
FIG. 19 is a block diagram of a target driving chip shown according to another exemplary embodiment.

An embodiment of the present disclosure provides a target driving chip 80. A display device where the target driving chip is located includes a controller, a plurality of driving chips, and an in-cell touch display panel. The target driving chip is one of a plurality of driving chips of the display device, and is respectively connected to the controller and the in-cell touch display panel. As shown in FIG. 19, the target driving chip 80 includes:

a processor 801; and a memory 802 configured to store an executable instruction of the processor therein, wherein when operating the executable instruction, the processor can execute a data transmission method for a target driving chip provided by an embodiment of the present disclosure.

Figure 20:
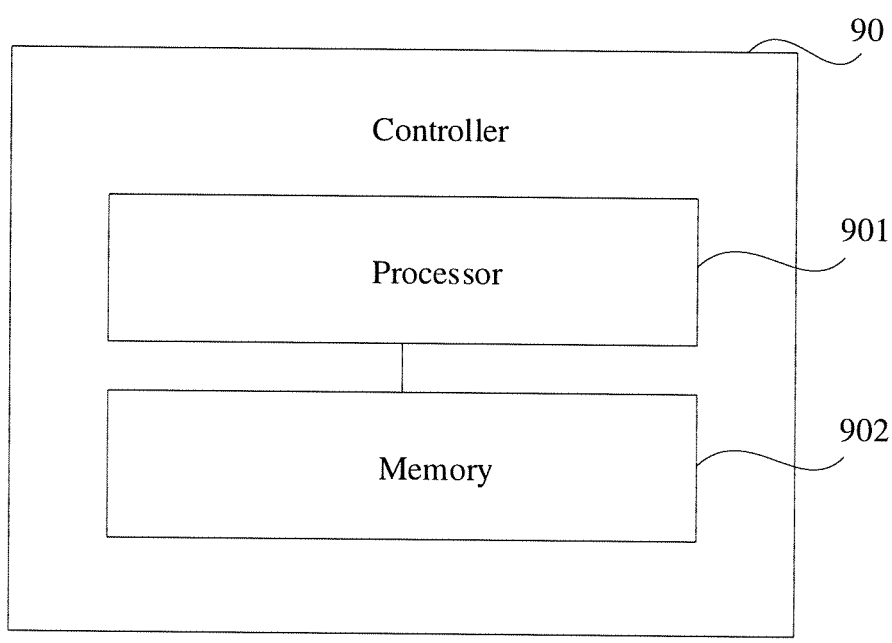
FIG. 20 is a block diagram of another controller shown according to yet another exemplary embodiment.

An embodiment of the present disclosure provides a controller 90. A display device where the controller 90 is located further includes a plurality of driving chips and an in-cell touch display panel. As shown in FIG. 20, the controller 90 includes:

a processor 901; and a memory 902 configured to store an executable instruction of the processor therein, wherein when operating the executable instruction, the processor can execute a data transmission method for a target driving chip provided by an embodiment of the present disclosure.

An embodiment of the present disclosure provides a display device, including a controller, a plurality of driving chips and an in-cell touch display panel.

The plurality of driving chips includes a target driving chip shown in FIG. 12, FIG. 14, or FIG. 15, and the controller includes a controller shown in FIG. 16 or FIG. 18; or the target driving chip among the plurality of driving chips is a target driving chip shown in FIG. 19, and the controller is a controller shown in FIG. 20.

The display device may be any product or component having a display function, such as an electronic paper, a mobile phone, a tablet computer, a television, a display, a notebook computer, a digital photo frame, or a navigator.

Optionally, the controller is connected to the target driving chip through a first differential signal line, and the target driving chip is configured to send return data to the controller through the first differential signal line.

Further optionally, the controller is connected to the target driving chip through not only the first differential signal line, but also a second differential signal line. The controller is configured to send a control signal to the target driving chip through the second differential signal line. The target driving chip is configured to send return data to the controller in real time through the first differential signal line.

Figure 21:
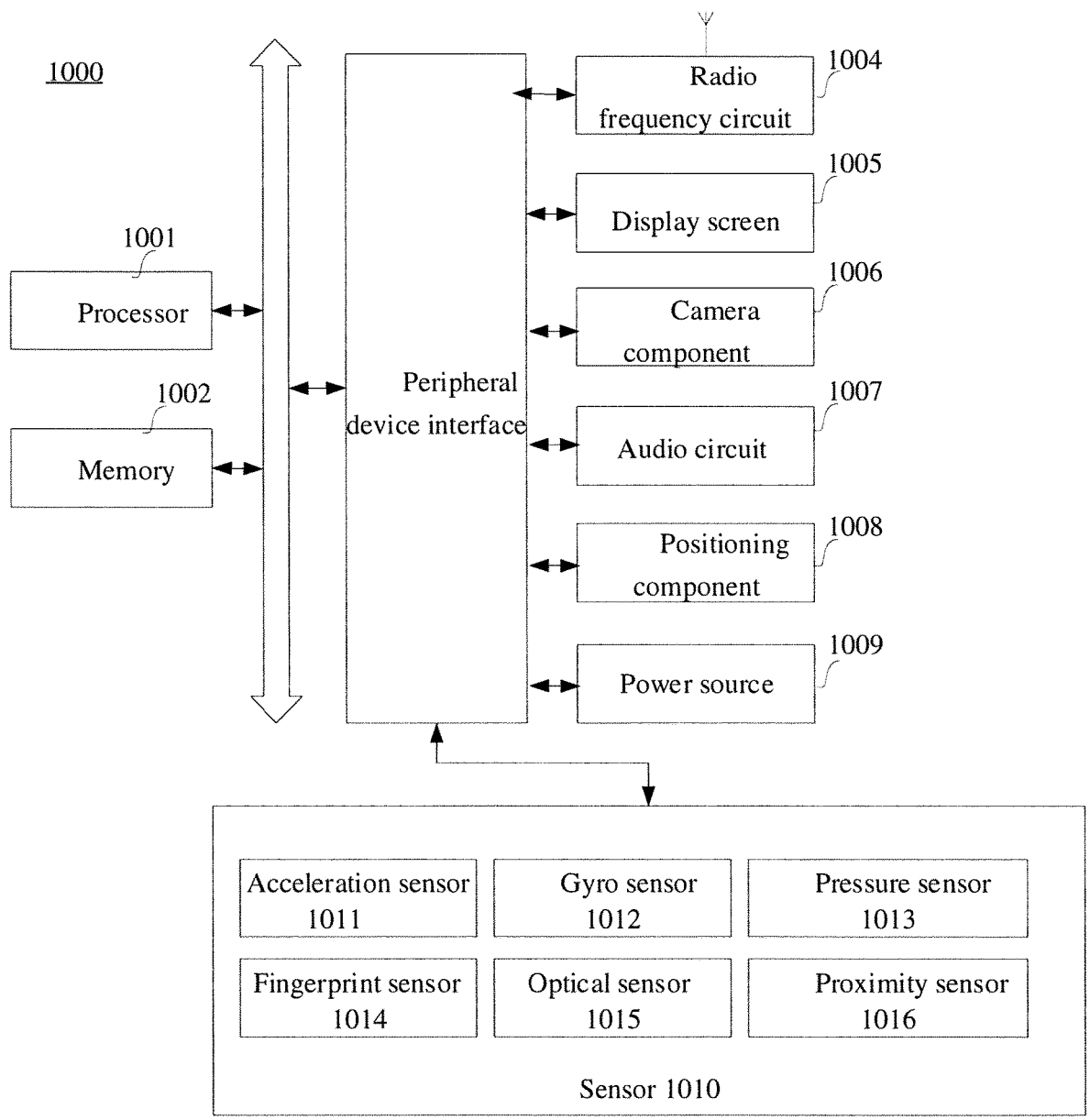
FIG. 21 is a block diagram of a display device shown according to an exemplary embodiment.

FIG. 21 is a structural block diagram of a display device 1000 in accordance with one embodiment of the present disclosure. The device 1000 may be any product or component having a display function, such as electronic paper, a mobile phone, a tablet computer, a television, a display, a notebook computer, a digital photo frame, or a navigator. Generally, the device 1000 includes a processor 1001 and a memory 1002.

The processor 1001 may include one or more processing cores, such as a 4-core processor and an 8-core processor. The processor 1001 may be realized by at least one form of hardware of the group consisting of a DSP (Digital Signal Processing), an FPGA (Field-Programmable Gate Array), and a PLA (Programmable Logic Array). The processor 1001 may also include a main processor and a coprocessor.

The main processor is a processor for processing the data in an awake state, and is also called a CPU (Central Processing Unit). The coprocessor is a low-power-consumption processor for processing the data in a standby state. In some embodiments, the processor 1001 may be integrated with a GPU (Graphics Processing Unit), which is configured to render and draw the content that needs to be displayed by a display screen. In some embodiments, the processor 1001 may also include an AI (Artificial Intelligence) processor configured to process computational operations related to machine learning.

The memory 1002 may include one or more computer-readable storage mediums, which can be non-transitory. The memory 1002 may also include a high-speed random access memory, as well as a non-volatile memory, such as one or more disk storage devices and flash storage devices. In some embodiments, the non-transitory storage medium in the memory 1002 is configured to store at least one instruction. The at least one instruction is configured to be executed by the processor 1001 to implement the data transmission method provided by the method embodiments of the present disclosure.

In some embodiments, the device 1000 also optionally includes a peripheral device interface 1003 and at least one peripheral device. The processor 1001, the memory 1002, and the peripheral device interface 1003 may be connected by a bus or a signal line. Each peripheral device may be connected to the peripheral device interface 1003 by a bus, a signal line, or a circuit board. In detail, the peripheral device includes at least one of a radio frequency circuit 1004, a touch display screen 1005, a camera component 1006, an audio circuit 1007, a positioning component 1008, and a power source 1009.

The peripheral device interface 1003 may be configured to connect at least one peripheral device associated with an I/O (Input/Output) to the processor 1001 and the memory 1002. In some embodiments, the processor 1001, the memory 1002, and the peripheral device interface 1003 are integrated on the same chip or circuit board. In some other embodiments, any one or two of the processors 1001, the memory 1002, and the peripheral device interface 1003 may be implemented on an independent chip or circuit board, which is not limited in the present embodiment.

The radio frequency circuit 1004 is configured to receive and transmit an RF (Radio Frequency) signal, which is also referred to as an electromagnetic signal. The radio frequency circuit 1004 communicates with a communication network and other communication devices via the electromagnetic signal. The radio frequency circuit 1004 converts the electrical signal into the electromagnetic signal for transmission, or converts the received electromagnetic signal into the electrical signal. Optionally, the radio frequency circuit 1004 includes an antenna system, an RF transceiver, one or more amplifiers, a tuner, an oscillator, a digital signal processor, a codec chipset, a subscriber identity module card, and the like. The radio frequency circuit 1004 can communicate with other apparatuses via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a WiFi (Wireless Fidelity) network. In some embodiments, the RF circuit 1004 may also include NFC (Near Field Communication) related circuits, which is not limited in the present disclosure.

The display screen 1005 is configured to display a UI (User Interface). The UI may include graphics, text, icons, videos, and any combination thereof. When the display screen 1005 is a touch display screen, the display screen 1005 also has the capability to collect touch signals on or above the surface of the display screen 1005. The touch signal may be input into the processor 1001 as a control signal for processing. At this time, the display screen 1005 may also be configured to provide virtual buttons and/or virtual keyboards, which are also referred to as soft buttons and/or soft keyboards. In some embodiments, for example, one display screen 1005 may be disposed on the front panel of the apparatus 1000. In some other embodiments, at least two display screens 1005 may be disposed respectively on different surfaces of the device 1000 or have a foldable design. In further embodiments, the display screen 1005 may be a flexible display screen disposed on the curved or foldable surface of the apparatus 1000. The display screen 1005 may even have an irregular shape other than a rectangle; that is, the display screen 1005 may be an irregular-shaped screen. The display screen 1005 may be an LCD (liquid Crystal Display) screen, an OLED (Organic Light-Emitting Diode) screen, or the like.

The camera component 1006 is configured to capture images or videos. In some embodiments of the present disclosure, the camera component 1006 includes a front camera and a rear camera. Usually, the front camera is placed on the front panel of the apparatus, and the rear camera is placed on the back of the apparatus. In some embodiments, at least two rear cameras are disposed, and are one of a main camera, a depth-of-field camera, a wide-angle camera, and a telephoto camera respectively, so as to realize a background blurring function achieved by fusion of the main camera and the depth-of-field camera, panoramic shooting, and VR (Virtual Reality) shooting functions achieved by fusion of the main camera and the wide-angle camera or other fusion shooting functions. In some embodiments, the camera component 1006 may also include a flashlight. The flashlight may be a mono-color temperature flashlight or a two-color temperature flashlight. The dual-color temperature flash is a combination of a warm flash and a cold flash and can be used for light compensation at different color temperatures.

The audio circuit 1007 may include a microphone and a speaker. The microphone is configured to collect sound waves of users and environments, and convert the sound waves into electrical signals which are input into the processor 1001 for processing, or input into the RF circuit 1004 for voice communication. For the purpose of stereo acquisition or noise reduction, there may be a plurality of microphones respectively disposed at different locations of the apparatus 1000. The microphone may also be an array microphone or an omnidirectional acquisition microphone. The speaker is then configured to convert the electrical signals from the processor 1001 or the radio frequency circuit 1004 into the sound waves. The speaker may be a conventional film speaker or a piezoelectric ceramic speaker. When the speaker is a piezoelectric ceramic speaker, the electrical signal can be converted into not only human-audible sound waves but also the sound waves which are inaudible to humans for the purpose of ranging and the like. In some embodiments, the audio circuit 1007 may also include a headphone jack.

The positioning component 1008 is configured to locate the current geographic location of the device 1000 to implement navigation or LBS (Location Based Service). The positioning component 1008 may be a positioning component based on the American GPS (Global Positioning System), the Chinese Beidou system, or the EU's Galileo system.

The power source 1009 is configured to power up various components in the apparatus 1000. The power source 1009 may be alternating current, direct current, a disposable battery, or a rechargeable battery. When the power source 1009 includes the rechargeable battery, the rechargeable battery may a wired rechargeable battery or a wireless rechargeable battery. The wired rechargeable battery is a battery charged with a cable, and wireless rechargeable battery is charged through a wireless coil. The rechargeable battery may also support the fast charging technology.

In some embodiments, device 1000 also includes one or more sensors 1010. The one or more sensors 1010 include, but not limited to, an acceleration sensor 1011, a gyro sensor 1012, a pressure sensor 1013, a fingerprint sensor 1014, an optical sensor 1015, and a proximity sensor 1016.

The acceleration sensor 1011 may detect magnitudes of accelerations on the three coordinate axes of a coordinate system established by the apparatus 1000. For example, the acceleration sensor 1011 may be configured to detect components of a gravitational acceleration on the three coordinate axes. The processor 1001 may control the touch display screen 1005 to display a user interface in a landscape view or a portrait view according to a gravity acceleration signal collected by the acceleration sensor 1011. The acceleration sensor 1011 may also be configured to collect motion data of a game or a user.

The gyro sensor 1012 can detect the orientation and the rotation angle of the apparatus 1000, and can cooperate with the acceleration sensor 1011 to collect a 3D motion that the user performs on the apparatus 1000. Based on the data collected by the gyro sensor 1012, the processor 1001 can realize the following functions: motion sensing (such as changing the UI according to a user's tilt operation), image stabilization during shooting, game control, and inertial navigation.

The pressure sensor 1013 may be disposed on a side frame of the device 1000 and/or a lower layer of the touch display screen 1005. When the pressure sensor 1013 is disposed on the side frame of the apparatus 1000, a user's gripping signal to the device 1000 can be detected. The processor 1001 can perform left-right hand recognition or shortcut operation according to the gripping signal collected by the pressure sensor 1013. When the pressure sensor 1013 is disposed on the lower layer of the touch display screen 1005, the processor 1001 controls an operable control on the UI according to a user's pressure operation on the touch display screen 1005. The operable control includes at least one of a button control, a scroll bar control, an icon control, and a menu control.

The fingerprint sensor 1014 is configured to collect a user's fingerprint. The processor 1001 identifies the user's identity based on the fingerprint collected by the fingerprint sensor 1014, or the fingerprint sensor 1014 identifies the user's identity based on the collected fingerprint. When the user's identity is identified to be trusted, the processor 1001 authorizes the user to perform related sensitive operations, such as unlocking the screen, viewing encrypted information, downloading software, paying, and changing settings. The fingerprint sensor 1014 may be provided on the front, back, or side of the apparatus 1000. When the device 1000 is provided with a physical button or a manufacturer's Logo, the fingerprint sensor 1014 may be integrated with the physical button or the manufacturer's Logo.

The optical sensor 1015 is configured to collect ambient light intensity. In one embodiment, the processor 1001 may control the display brightness of the touch display screen 1005 according to the ambient light intensity collected by the optical sensor 1015. In detail, when the ambient light intensity is high, the display brightness of the touch display screen 1005 is increased; and when the ambient light intensity is low, the display brightness of the touch display screen 1005 is decreased. In another embodiment, the processor 1001 may also dynamically adjust shooting parameters of the camera component 1006 according to the ambient light intensity collected by the optical sensor 1015.

The proximity sensor 1016, also referred to as a distance sensor, is usually disposed on the front panel of the apparatus 1000. The proximity sensor 1016 is configured to capture a distance between the user and a front surface of the apparatus 1000. In one embodiment, when the proximity sensor 1016 detects that the distance between the user and the front surface of the device 1000 becomes gradually closer, the processor 1001 controls the touch display screen 1005 to switch from a screen-on state to a screen-off status. When it is detected that the distance between the user and the front surface of the device 1000 becomes gradually farther, the processor 1001 controls the touch display screen 1005 to switch from the screen-off state to the screen-on status.

It will be understood by those skilled in the art that the structure shown in FIG. 5 does not constitute a limitation to the apparatus 1000, and may include more or less components than those illustrated, or combine some components, or adopt different component arrangements.

Optionally, the device 1000 may further include a controller and a plurality of driving chips (not illustrated in FIG. 21). The device 1000 includes an in-cell touch display panel (for example, the display screen and the sensor illustrated in FIG. 21).

An embodiment of the present disclosure provides a storage medium configured to store an instruction therein. When executing the instruction, a processing component executes the data transmission method for the target driving chip or the controller provided by the embodiment of the present disclosure.

An embodiment of the present disclosure provides a chip. The chip includes a programmable logic circuit and/or program instruction. The chip is configured to implement the data transmission method for the target driving chip or the controller provided by the embodiment of the present disclosure when in operation.

An embodiment of the present disclosure provides a program product configured to store an instruction therein. When executing the instruction, the processing component implements the data transmission method for the target driving chip or the controller provided by the embodiment of the present disclosure.

With regard to the devices in the above embodiments, the specific manner in which the respective modules perform the operations has been described in detail in the embodiment related to the method, and will not be explained in detail herein. The sequence of the steps in the method embodiments provided by the present disclosure may be adjusted appropriately, and the steps may be removed or added according to the situation. Within the technical scope disclosed in the present disclosure, any variations of the method easily derived by a person skilled in the art shall fall within the protection scope of the present disclosure, which will not be repeated here.

The terms "first" and "second" in the present disclosure are merely used to describe but not to denote or imply any relative importance. The term "a plurality of" means two or more, unless otherwise expressly provided.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A data transmission method, which is applied to a target driving chip in a display device, wherein the display device comprises a controller, a plurality of driving chips, and an in-cell touch display panel; the target driving chip is one of the plurality of driving chips, and is respectively connected to the controller and the in-cell touch display panel; the method comprises:
    receiving state data acquired by the in-cell touch display panel, the state data being configured to reflect a working state of the in-cell touch display panel and including touch data; and
    sending return data to the controller, the return data including the state data and working mode data of the target driving chip, wherein the working mode data is configured to indicate a working mode of the target driving chip, the working mode is configured to indicate a current data processing rate of the target driving chip and comprises a low-speed working mode or a high-speed working mode, the data processing rate in the high-speed working mode is higher than that in the low-speed working mode, and the target driving chip switches its working mode according to an amount of data that needs to be processed currently.

2. The method according to claim 1, wherein the controller is connected to the target driving chip through a first differential signal line; and sending the return data to the controller comprises:
    sending the return data to the controller through the first differential signal line.

3. The method according to claim 2, wherein sending the return data to the controller through the first differential signal line comprises:
    sending the return data to the controller through the first differential signal line in a form of a data packet, wherein
    the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission, and wherein the start bit, the data bit, and the stop bit are all represented by a difference value of 0 or 1, and each difference value occupies 1 bit.

4. The method according to claim 3, wherein the data packet further comprises: a setup mode bit and a mode setting bit which are arranged in sequence between the start bit and the data bit, and a check bit between the data bit and the stop bit, wherein
    the setup mode bit is configured to indicate a mode of a mode setting of the data packet, the mode setting bit is configured to indicate a mode of the data packet, the check bit is configured to perform data check, and the mode of the data packet includes any one of a request mode and a response mode.

5. The method according to claim 1, wherein the touch data comprises at least one of touch position data and touch pressure data; and
    wherein the touch position data comprises a coordinate value for indicating a position of a touch point, and the touch pressure data comprises a pressure value for indicating a pressure on the touch point.

6. The method according to claim 1, wherein the return data further comprises at least one of first indication information and second indication information, wherein
    the first indication information is configured to indicate whether the working state of the in-cell touch display panel is abnormal, and the second indication information is configured to indicate whether a working state of the target driving chip is abnormal, wherein the first indication information and the second indication information are represented by two preset characters, 0 and 1, where 0 indicates a normal working state, and 1 indicates an abnormal working state.

7. The method according to claim 1, wherein the in-cell touch display panel comprises a sensor; and receiving the state data acquired by the in-cell touch display panel comprises:
    receiving the touch data and data collected by the sensor, wherein the sensor comprises at least one of a temperature sensor, a position sensor, an infrared sensor, or an ultrasonic sensor, and the data collected by the sensor comprises at least one of temperature data collected by the temperature sensor, position data collected by the position sensor, infrared data collected by the infrared sensor, or ultrasonic data collected by the ultrasonic sensor.

8. The method according to claim 1, wherein prior to sending the return data to the controller, the method further comprises:
    performing analog-to-digital conversion of the state data in a form of an analog signal to obtain the state data in a form of a digital signal; and
    generating the return data, the return data comprising the state data in the form of a digital signal.

9. The method according to claim 1, wherein the controller is connected to the target driving chip through a first differential signal line, and the controller is further connected to the target driving chip through a second differential signal line; and the method further comprises:
    receiving a control signal sent by the controller through the second differential signal line; and
    sending the return data to the controller comprises:
    sending the return data to the controller in real time through the first differential signal line,
    such that the target driving chic is connected to the controller through the first differential signal line and the second differential signal line at the same time, and said receiving the control signal and said sending the return data are independent of each other, thereby achieving real-time transmission of the return data.

10. The method according to claim 1, wherein the in-cell touch display panel is any one of an organic light-emitting diode (OLED) display panel, a quantum dot display panel, a micro light-emitting diode display panel, and a liquid crystal display panel which are integrated with a touch function layer;
the target driving chip is any one of a source driving chip and a gate driving chip; and
the controller is any one of a timing controller, a system chip SOC, and a micro control unit MCU integrated in the timing controller.

11. A target driving chip, wherein a display device where the target driving chip is located comprises a controller, a plurality of driving chips, and an in-cell touch display panel; the target driving chip is one of the plurality of driving chips, and is respectively connected to the controller and the in-cell touch display panel; and the target driving chip is configured to implement the data transmission method according to claim 1.

12. A non-transitory computer-readable storage medium, comprising instructions stored therein, wherein
when operating on a processing component of a computer, the instructions cause the processing component to execute the data transmission method according to claim 1.

13. The method according to claim 4, wherein the touch data comprises at least one of touch position data and touch pressure data;
the return data further comprises at least one of first indication information and second indication information, wherein the first indication information is configured to indicate whether the working state of the in-cell touch display panel is abnormal, and the second indication information is configured to indicate whether a working state of the target driving chip is abnormal;
the in-cell touch display panel comprises a sensor; and receiving the state data acquired by the in-cell touch display panel comprises: receiving the touch data and data collected by the sensor;
prior to sending the return data to the controller, the method further comprises: performing analog-to-digital conversion of the state data in a form of an analog signal to obtain the state data in a form of a digital signal; and generating the return data, the return data comprising the state data in the form of a digital signal;
the controller is connected to the target driving chip through a first differential signal line, and the controller is further connected to the target driving chip through a second differential signal line; and the method further comprises: receiving a control signal sent by the controller through the second differential signal line; and sending the return data to the controller comprises: sending the return data to the controller in real time through the first differential signal line;
the in-cell touch display panel is any one of an organic light-emitting diode (OLED) display panel, a quantum dot display panel, a micro light-emitting diode display panel, and a liquid crystal display panel which are integrated with a touch function layer; the target driving chip is any one of a source driving chip and a gate driving chip; and the controller is any one of a timing controller, a system chip SOC, and a micro control unit MCU integrated in the timing controller.

14. A data transmission method, which is applied to a controller in a display device, wherein the display device comprises the controller, a plurality of driving chips, and an in-cell touch display panel; and the method comprises:
receiving return data sent by a target driving chip, the return data comprising state data and working mode data of the target driving chip, wherein the working mode data is configured to indicate a working mode of the target driving chip, the working mode is configured to indicate a current data processing rate of the target driving chip and comprises a low-speed working mode or a high-speed working mode, the data processing rate in the high-speed working mode is higher than that in the low-speed working mode, and the target driving chip switches its working mode according to an amount of data that needs to be processed currently;
wherein the target driving chip is one of the plurality of driving chips, and the target driving chip is respectively connected to the controller and the in-cell touch display panel;
the return data is sent by the target driving chip to the controller after the target driving chip receives the state data acquired by the in-cell touch display panel, the state data being configured to reflect a working state of the in-cell touch display panel and including touch data.

15. A controller, wherein a display device where the controller is located further comprises a plurality of driving chips and an in-cell touch display panel; and the controller is configured to implement the data transmission method according to claim 14.

16. The method according to claim 14, wherein the controller is connected to the target driving chip through a first differential signal line, and is further connected to the target driving chip through a second differential signal line; the method further comprises:
sending a control signal to the target driving chip through the second differential signal line; and
receiving the return data sent by the target driving chip comprises:
receiving the return data sent by the target driving chip in real time and transmitted in a form of a data packet through the first differential signal line;
wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission; the data packet further comprises: a setup mode bit and a mode setting bit which are arranged in sequence between the start bit and the data bit, and a check bit between the data bit and the stop bit, wherein the setup mode bit is configured to indicate a mode of a mode setting of the data packet, the mode setting bit is configured to indicate a mode of the data packet, the check bit is configured to perform data check, and the mode of the data packet includes any one of a request mode and a response mode.

17. The target driving chip according to claim 11, wherein the target driving chip is configured to implement the data transmission method according to claim 14.

18. The controller according to claim 15, wherein the controller is configured to implement the data transmission method according to claim 16.

19. A display device, comprising a controller, a plurality of driving chips, and an in-cell touch display panel;
wherein a target driving chip in the plurality of driving chips is respectively connected to the controller and the in-cell touch display panel, and the target driving chip is one of the plurality of driving chips;

the target driving chip is configured to: receive state data acquired by the in-cell touch display panel, and send return data to the controller;

the controller is configured to receive the return data sent by the target driving chip;

wherein the state data is configured to reflect a working state of the in-cell touch display panel and including touch data, and the return data comprises the state data and working mode data of the target driving chip, wherein the working mode data is configured to indicate a working mode of the target driving chip, the working mode is configured to indicate a current data processing rate of the target driving chip and comprises a low-speed working mode or a high-speed working mode, the data processing rate in the high-speed working mode is higher than that in the low-speed working mode, and the target driving chip switches its working mode according to an amount of data that needs to be processed currently.

20. The display device according to claim 19, the controller is connected to the target driving chip through a first differential signal line, and is further connected to the target driving chip through a second differential signal line;

the controller is configured to: send a control signal to the target driving chip through the second differential signal line;

the target driving chip is configured to: send the return data transmitted in a form of a data packet to the controller in real time through the first differential signal line;

wherein the data packet comprises a start bit, a data bit, and a stop bit which are arranged in sequence, wherein the start bit is configured to indicate the start of data transmission, the data bit is configured to carry data to be transmitted, and the stop bit is configured to indicate the end of data transmission; the data packet further comprises: a setup mode bit and a mode setting bit which are arranged in sequence between the start bit and the data bit, and a check bit between the data bit and the stop bit, wherein the setup mode bit is configured to indicate a mode of a mode setting of the data packet, the mode setting bit is configured to indicate a mode of the data packet, the check bit is configured to perform data check, and the mode of the data packet includes any one of a request mode and a response mode;

the touch data comprises at least one of touch position data and touch pressure data;

the return data further comprises at least one of first indication information and second indication information, wherein the first indication information is configured to indicate whether the working state of the in-cell touch display panel is abnormal, and the second indication information is configured to indicate whether a working state of the target driving chip is abnormal;

the in-cell touch display panel comprises a sensor; and the target driving chip is configured to: receive the touch data and data collected by the sensor;

the target driving chip is further configured to: prior to sending the return data to the controller, perform analog-to-digital conversion of the state data in a form of an analog signal to obtain the state data in a form of a digital signal; and generate the return data, the return data comprising the state data in the form of a digital signal;

the target driving chip is any one of a source driving chip and a gate driving chip; the in-cell touch display panel is any one of an organic light-emitting diode (OLED) display panel, a quantum dot display panel, a micro light-emitting diode display panel, and a liquid crystal display panel which are integrated with a touch function layer; and the controller is any one of a timing controller, a system chip SOC, and a micro control unit MCU integrated in the timing controller.

* * * * *